United States Patent
Wang

(10) Patent No.: US 12,428,164 B2
(45) Date of Patent: Sep. 30, 2025

(54) ENVIRONMENTAL CONTROL SYSTEM HAVING A FUEL CELL ASSEMBLY

(71) Applicant: General Electric Company, Schenectady, NY (US)

(72) Inventor: Honggang Wang, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 405 days.

(21) Appl. No.: 17/745,293

(22) Filed: May 16, 2022

(65) Prior Publication Data
US 2023/0365263 A1 Nov. 16, 2023

(51) Int. Cl.
| B64D 13/08 | (2006.01) |
| H01M 8/10 | (2016.01) |
| B64D 13/06 | (2006.01) |
| B64D 41/00 | (2006.01) |

(52) U.S. Cl.
CPC .............. B64D 13/08 (2013.01); H01M 8/10 (2013.01); *B64D 2013/0644* (2013.01); *B64D 2013/0688* (2013.01); *B64D 2041/005* (2013.01); *H01M 2008/1095* (2013.01); *H01M 2250/20* (2013.01)

(58) Field of Classification Search
CPC ............ B64D 13/08; B64D 2013/0644; B64D 2013/0688; B64D 2041/005; H01M 8/10; H01M 2008/1095; H01M 2250/20
USPC .......................................................... 454/76
See application file for complete search history.

(56) References Cited

U.S. PATENT DOCUMENTS

| 3,658,279 A | 4/1972 | Robertson |
| 3,805,517 A | 4/1974 | Sewell et al. |
| 4,684,081 A | 8/1987 | Cronin |
| 5,227,256 A | 7/1993 | Marianowski et al. |
| 5,581,995 A | 12/1996 | Lucenko et al. |
| 5,858,314 A | 1/1999 | Hsu et al. |
| 5,968,680 A | 10/1999 | Wolfe et al. |

(Continued)

FOREIGN PATENT DOCUMENTS

| CA | 2446360 A1 | 4/2004 |
| CN | 100367556 C | 2/2008 |

(Continued)

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.

(Continued)

*Primary Examiner* — Avinash A Savani
*Assistant Examiner* — Dana K Tighe
(74) *Attorney, Agent, or Firm* — Dority & Manning, P.A.

(57) ABSTRACT

An environmental control system assembly is provided for an aircraft. The assembly includes: an environmental control system; a cabin airflow delivery system in airflow communication with the environmental control system for receiving a cabin inlet airflow from the environmental control system; a cabin exhaust delivery system configured to be in airflow communication with a cabin of the aircraft for receiving a cabin exhaust airflow when the environmental control system assembly is installed in the aircraft; and a fuel cell assembly in airflow communication with the cabin exhaust delivery system for receiving the cabin exhaust airflow.

14 Claims, 10 Drawing Sheets

(56) References Cited

U.S. PATENT DOCUMENTS

| | | | |
|---|---|---|---|
| 6,183,703 B1 | 2/2001 | Hsu et al. |
| 6,296,957 B1 | 10/2001 | Graage |
| 6,348,278 B1 | 2/2002 | LaPierre et al. |
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,239,035 B2 | 7/2007 | Garces et al. |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,743,499 B2 | 6/2010 | Pettit et al. |
| 7,781,115 B2 | 8/2010 | Lundberg |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 | 6/2011 | Daggett |
| 8,137,854 B2 | 3/2012 | Gans |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,468,847 B2 | 6/2013 | Klewer |
| 8,524,412 B2 | 9/2013 | Rock et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 | 9/2016 | Kim et al. |
| 9,444,108 B2 | 9/2016 | Brousseau |
| 9,464,573 B2 | 10/2016 | Remy et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 | 5/2018 | Libis et al. |
| 10,008,726 B2 | 6/2018 | Leah et al. |
| 10,035,607 B2 | 7/2018 | Wangemann et al. |
| 10,069,150 B2 | 9/2018 | Mata et al. |
| 10,224,556 B2 | 3/2019 | Lents et al. |
| 10,318,003 B2 | 6/2019 | Gannon et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 | 5/2020 | Stoia et al. |
| 10,671,092 B2 | 6/2020 | DiRusso et al. |
| 10,676,208 B2 | 6/2020 | Wangemann et al. |
| 10,724,432 B2 | 7/2020 | Shapiro et al. |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 | 9/2020 | Sennoun |
| 10,814,992 B2 | 10/2020 | Halsey et al. |
| 10,913,543 B2 | 2/2021 | Bailey et al. |
| 10,919,635 B2 | 2/2021 | Edgar et al. |
| 10,950,875 B1 | 3/2021 | Radhakrishnan et al. |
| 10,967,984 B2 | 4/2021 | Willford et al. |
| 10,978,723 B2 | 4/2021 | Lo et al. |
| 11,015,480 B2 | 5/2021 | Waun |
| 11,114,855 B2 | 9/2021 | Handelsman et al. |
| 2002/0163819 A1 | 11/2002 | Treece |
| 2004/0081871 A1 | 4/2004 | Kearl et al. |
| 2004/0150366 A1 | 8/2004 | Ferrall et al. |
| 2006/0010866 A1 | 1/2006 | Rehg et al. |
| 2008/0155984 A1 | 7/2008 | Liu et al. |
| 2010/0133475 A1 | 6/2010 | Kobayashi et al. |
| 2010/0138070 A1 | 6/2010 | Beaudoin |
| 2010/0159303 A1 | 6/2010 | Rock et al. |
| 2011/0071707 A1 | 3/2011 | Crumm et al. |
| 2012/0161512 A1 | 6/2012 | Metzler et al. |
| 2012/0301814 A1 | 11/2012 | Beasley et al. |
| 2013/0099560 A1 | 4/2013 | Shipley et al. |
| 2013/0280634 A1 | 10/2013 | Park et al. |
| 2014/0023945 A1 | 1/2014 | Epstein et al. |
| 2014/0325991 A1 | 11/2014 | Liew et al. |
| 2015/0030947 A1 | 1/2015 | Saunders et al. |
| 2015/0151844 A1 | 6/2015 | Anton et al. |
| 2016/0260991 A1 | 9/2016 | Shapiro et al. |
| 2017/0070088 A1 | 3/2017 | Bernsten et al. |
| 2018/0003072 A1 | 1/2018 | Lents et al. |
| 2018/0141675 A1 | 5/2018 | Halsey et al. |
| 2018/0166734 A1 | 6/2018 | Linde et al. |
| 2018/0319283 A1 | 11/2018 | Battin et al. |
| 2019/0121369 A1 | 4/2019 | DiRusso et al. |
| 2019/0136761 A1 | 5/2019 | Shapiro et al. |
| 2019/0145273 A1 | 5/2019 | Frank et al. |
| 2020/0014044 A1 | 1/2020 | Tichy et al. |
| 2020/0062414 A1 | 2/2020 | Hon et al. |
| 2020/0063599 A1 | 2/2020 | Waun |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0313207 A1 | 10/2020 | Milcarek et al. |
| 2021/0003281 A1 | 1/2021 | Amble et al. |
| 2021/0075034 A1 | 3/2021 | Irie et al. |
| 2021/0115857 A1 | 4/2021 | Collopy |
| 2021/0254545 A1* | 8/2021 | Ajami ................ F02C 7/36 |
| 2022/0177141 A1* | 6/2022 | Shea ................ B64D 13/06 |

FOREIGN PATENT DOCUMENTS

| | | |
|---|---|---|
| CN | 106976405 A | 7/2017 |
| DE | 102005012230 A1 | 10/2005 |
| DE | 10200950812 B4 | 4/2017 |
| EP | 2800186 B1 | 2/2018 |
| EP | 3336948 B1 | 9/2019 |
| EP | 3805107 A1 | 4/2021 |
| GB | 2522865 A | 8/2015 |
| JP | 2009187756 A | 8/2009 |
| JP | 2011002308 A | 1/2011 |
| JP | 2018087501 A | 6/2018 |
| KR | 20090064853 A | 6/2009 |
| WO | WO9965097 A1 | 12/1999 |
| WO | WO2018108962 A1 | 6/2018 |
| WO | WO2019160036 A1 | 8/2019 |
| WO | WO2020/011380 A1 | 1/2020 |

OTHER PUBLICATIONS

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5e1a000b517423bb51a8/713ca211b68&mc=true&node=pt14.1.33&rgn=diy5#se 14.1.33_175.

(56) References Cited

OTHER PUBLICATIONS

Feiner, Power-by-Wire Aircraft Secondary Power Systems, AIAA/IEEE Digital Avionics System Conference 1993 Proceedings, 1993, pp. 439-444. (Abstract Only) https://ieeexplore.ieee.org/document/283510.

Honegger, Gas Turbine Combustion Modeling for a Parametric Emissions Monitoring System, Thesis Kansas State University College of Engineering, Manhattan Kansas, 2004, 97 Pages. https://core.ac.uk/download/pdf/5164453.pdf.

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.

Long et al., A New Concept Environmental Control System with Energy Recovery Considerations for Commercial Aircraft, ICES-2014-099, 44$^{th}$ International Conference on Environmental Systems, Tucson, Arizona, 10 Pages. https://ttu-ir.tdl.org/bitstream/handle/2346/59633/ICES-2014-99.pdf?sequence=&isAllowed=y.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.energy.gov/sites/prod/files/2014/03/f9/sofc_for_aircraft_pnnl 2012.pdf.

\* cited by examiner

ENVIRONMENTAL CONTROL SYSTEM HAVING A FUEL CELL ASSEMBLY

FIELD

The present disclosure relates to an environmental control system assembly for an aircraft including an environmental control system and a fuel cell assembly.

BACKGROUND

Commercial aircraft typically include an environmental control system, or ECS, to maintain a temperature and pressure within a cabin of the aircraft within a desired range. For example, it will be appreciated that modern commercial aircraft are configured to cruise at relatively high altitudes where an ambient temperature is much lower than would be reasonable for passengers within the cabin, and further where an ambient pressure is much lower than would be reasonable for passengers within the cabin. The ECS may provide an airflow to the cabin to maintain a cabin temperature and a cabin pressure within a desired range.

Supplying power to the ECS can be burdensome, particularly for certain ECS locations. Accordingly, a system and method for improving the provision of power to the ECS would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
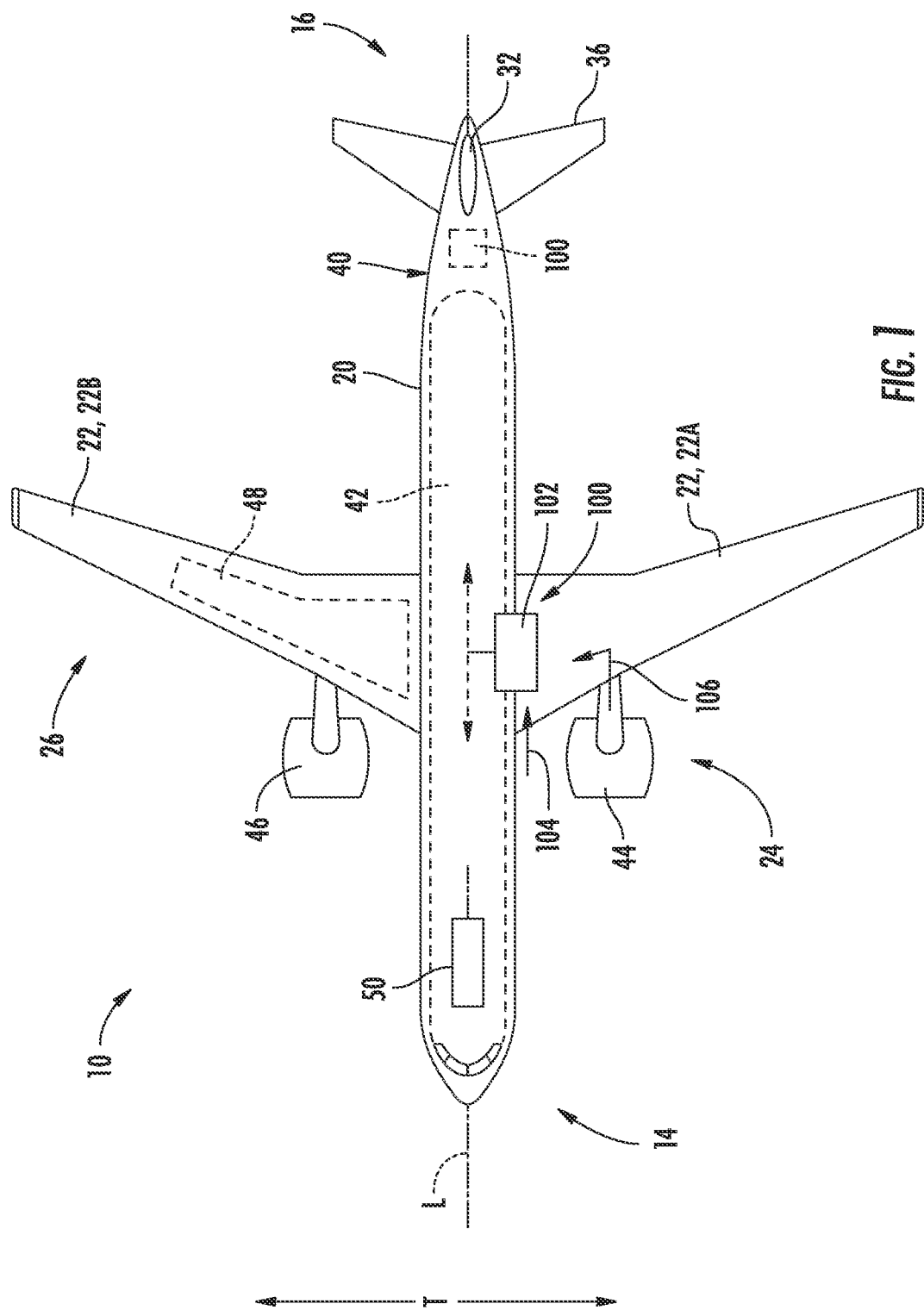
FIG. 1 is a top view of an aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure is generally related to an environmental control system assembly ("ECS assembly") for an aircraft. The ECS assembly includes an environmental control system ("ECS"), a cabin airflow delivery system, a cabin exhaust delivery system, and a fuel cell assembly. The ECS is generally configured to generate a cabin inlet airflow and the cabin airflow delivery system is in airflow communication with the ECS for receiving the cabin inlet airflow and providing such cabin inlet airflow to a cabin of the aircraft to maintain a desired temperature and pressure within the cabin. The cabin exhaust delivery system is in airflow communication with the cabin of the aircraft for receiving a cabin exhaust airflow from the cabin.

In a first exemplary embodiment, the cabin exhaust delivery system is further in airflow communication with the fuel cell assembly for providing at least a portion of the cabin exhaust airflow to the fuel cell assembly. The fuel cell assembly may be configured to generate electric power using the cabin exhaust airflow.

In at least certain exemplary aspects of this first embodiment, the fuel cell assembly may be a polymer exchange membrane (PEM) fuel cell assembly including PEM fuel cells. PEM fuel cells generally require an airflow between, e.g., 60 degrees Celsius and 90 degrees Celsius. During operation of the aircraft at, e.g., a cruise operation, significant energy would be required to condition the ambient airflow to be within this temperature range. Similar constraints exist on a pressure of the airflow provided to PEM fuel cells. The inventors of the present disclosure, however, found that by utilizing the cabin exhaust airflow, little to no pre-conditioning of the airflow is required to generate electricity using the cabin exhaust airflow, providing significant efficiency benefits.

In a second exemplary embodiment, the ECS assembly further includes a controller operably connected to the fuel cell assembly. The controller may be operable to modulate an amount of power generated by the fuel cell assembly and provided to the ECS based on load forecasting data from an ECS load forecasting module of the controller. The ECS load forecasting module may determine the load forecasting data based on a passenger number for the aircraft, weather forecast data, historical data, or a combination thereof. In particular, the ECS load forecasting module may determine the load forecasting data based on the passenger number for the aircraft. The inventors of the present disclosure found a strong correlation between an amount of power required by the ECS and the passenger number. By utilizing this correlation, the load forecasting data may be determined, allowing for a controller of the fuel cell assembly to provide a desired amount of power to operate the ECS, e.g., without a need for external power.

Referring now to the drawings, wherein identical numerals indicate the same elements throughout the FIGS., FIG. 1 provides a top view of an exemplary aircraft 10 as may incorporate various embodiments of the present disclosure. As shown in FIG. 1, the aircraft 10 defines a longitudinal direction L that extends therethrough, a transverse direction T, a forward end 14, and an aft end 16.

Moreover, the aircraft 10 includes a fuselage 20, extending longitudinally from the forward end 14 of the aircraft 10 towards the aft end 16 of the aircraft 10, and a pair of wings 22, or rather, a first wing 22A and a second wing 22B. The first wing 22A extends outwardly from the fuselage 20 generally along the transverse direction T with respect to the longitudinal direction L, from a port side 24 of the fuselage 20. Further, the second wing 22B similarly extends outwardly from the fuselage 20, generally along the transverse direction T with respect to the longitudinal direction L, from a starboard side 26 of the fuselage 20. In addition, the aircraft 10 further includes a vertical stabilizer 32 and a pair of horizontal stabilizers 36. The fuselage 20 additionally includes an outer surface 40 and defines a cabin 42 inward of the outer surface 40 of the fuselage 20 (depicted in phantom in FIG. 1). The cabin 42 generally refers to an area to be occupied by one or more passengers, crew, or both during a flight operation of the aircraft 10. The fuselage 20, wings 22, and stabilizers 32, 36 may together be referred to as a body of the aircraft 10.

However, it should be appreciated that in other exemplary embodiments of the present disclosure, the aircraft 10 may additionally or alternatively include any other suitable configuration of, e.g., stabilizers that may or may not extend directly along a vertical direction or horizontal/transverse direction T, wings 22, etc.

The exemplary aircraft 10 of FIG. 1 also includes a propulsion system. The exemplary propulsion system depicted includes a plurality of aircraft engines, at least one of which is mounted to each of the pair of wings 22A, 22B. Specifically, the plurality of aircraft engines includes a first aircraft engine 44 mounted to the first wing 22A and a second aircraft engine 46 mounted to the second wing 22B. In at least certain exemplary embodiments, the aircraft engines 44, 46 may be configured as turbofan jet engines suspended beneath the wings 22A, 22B in an under-wing configuration.

Alternatively, however, in other exemplary embodiments any other suitable aircraft engine may be provided. For example, in other exemplary embodiments the first and/or second aircraft engines 44, 46 may alternatively be configured as turbojet engines, turboshaft engines, turboprop engines, etc. Further, in still other exemplary embodiments, the propulsion system may additionally or alternatively include one or more electric, or hybrid-electric, aircraft engines (e.g., electric fans).

The aircraft 10 may further include one or more fuel tanks 48. In at least certain exemplary aspects, as is depicted in phantom in FIG. 1, the one or more fuel tanks 48 of the aircraft 10 may be housed within the wings 22A, 22B of the aircraft 10 (depicted in phantom only in wing 22B for clarity). The one or more fuel tanks 48 may provide fuel to the aircraft engines 44, 46 of the propulsion system of the aircraft 10.

Moreover, it will be appreciated that the exemplary aircraft 10 of FIG. 1 further includes an environmental control system assembly 100 (or "ECS assembly 100") having an environmental control system 102 (or "ECS 102"). The ECS 102 may generally be configured to receive an airflow, such as an ambient airflow or ram airflow 104 from a ram air inlet, a bleed airflow 106 from one or both of the aircraft engines 44, 46, or both. The ECS 102 is further configured to condition such airflow and provide such airflow to the cabin 42 to assist with pressurizing the cabin 42 and providing thermal control of the cabin 42, and optionally to provide cooling for accessory systems, such as avionics.

Notably, for the embodiment depicted, the ECS assembly 100 is located generally at a juncture between the first wing 22A and the fuselage 20. However, in other exemplary embodiments, the ECS assembly 100 may additionally or alternatively be located at any other suitable location within the aircraft 10. For example, in other exemplary embodiments, the ECS assembly 100 may be located at a juncture between the second wing 22B and the fuselage 20, or alternatively, as depicted in phantom, at the aft end 16 of the aircraft 10.

Briefly, it will further be appreciated that the aircraft 10 includes an aircraft controller 50. The aircraft controller 50 may be operably coupled to one or more outside data sources for receiving data from such outside data sources relating to, e.g., a passenger number (or passenger count) for a particular flight operation, weather data for the flight operation, flight data, etc. The aircraft controller 50 may include a similar structure as the controller 250 of the ECS assembly 100 described below with reference to FIG. 5.

Figure 2:
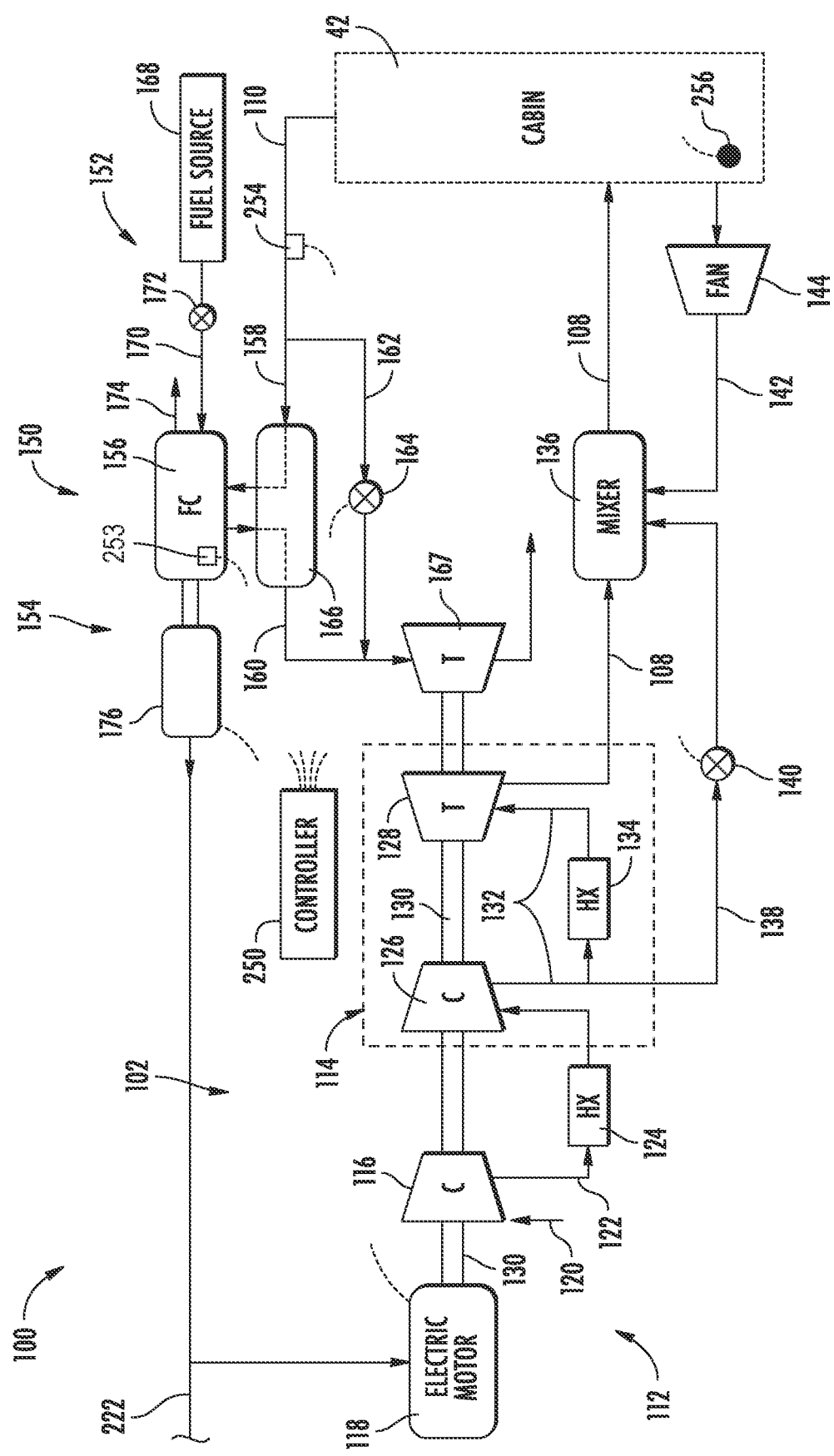
FIG. 2 is a schematic diagram of an environmental control system assembly in accordance with an exemplary embodiment of the present disclosure.

Referring now to FIG. 2, a schematic diagram is provided of the exemplary ECS assembly 100 introduced above with reference to FIG. 1. As will be appreciated, the exemplary ECS assembly 100 is operable with the cabin 42 of the aircraft 10 to, e.g., provide cooling air to the cabin 42.

As will be appreciated, the ECS assembly 100 generally includes the ECS 102 for generating a cabin inlet airflow, a cabin airflow delivery system 108 in airflow communication with the ECS 102 for receiving the cabin inlet airflow from the ECS 102 and providing the cabin inlet airflow to the cabin 42, and a cabin exhaust delivery system 110 in airflow communication with the cabin 42 for receiving a cabin exhaust airflow from the cabin 42.

The ECS 102 generally includes a compressed airflow source 112 and an air cycle machine 114 (enclosed by phantom lines in FIG. 2). In the embodiment shown, the compressed airflow source 112 includes an initial compressor 116 and an electric motor 118 drivingly coupled to the initial compressor 116 and the air cycle machine 114. The initial compressor 116 is in airflow communication with an ECS inlet 120 configured to receive an ECS inlet airflow, which may be, e.g., an ambient airflow from a ram air inlet (see, e.g., ram airflow 104 of FIG. 1). The initial compressor 116 is configured to compress the ECS inlet airflow received from the ECS inlet 120, referred to below as simply an ECS airflow. The compressed ECS airflow is then provided to the air cycle machine 114 through a first duct 122. As will be appreciated, during certain flight operations, the ECS airflow may be relatively cool. While compressing the ECS airflow through the initial compressor 116 may increase a temperature of the ECS airflow, the ECS 102 further includes a first heat exchanger 124 in thermal communication with the first duct 122 for adding heat to the compressed ECS airflow through the first duct 122.

Briefly, it will be appreciated that the compressed airflow source 112 may be any other suitable source of compressed airflow. For example, in other embodiments, the compressed airflow source 112 may be a bleed airflow source configured to received bleed airflow from an engine of the aircraft (e.g., bleed airflow 106 depicted in FIG. 1). With such a configuration, the compressed airflow source 112 may include a pressure reducer to reduce a pressure of the bleed airflow and, optionally, a heat exchanger to modify a temperature of the bleed airflow provided to the air cycle machine 114 such that it is within an acceptable temperature range. In such a manner, the compressed airflow source 112 may generally be referred to as an airflow conditioner, as it may be configured to provide compressed airflow within the acceptable pressure (and optionally temperature) range to the air cycle machine 114.

Referring still to FIG. 2, the air cycle machine 114 includes an air cycle machine compressor 126 and an air cycle machine turbine 128. Notably, for the embodiment shown, the initial compressor 116, the air cycle machine compressor 126, and the air cycle machine turbine 128 are each coupled to a common ECS shaft 130, with the ECS shaft 130 rotatable with, and more specifically rotatably driven by, the electric motor 118. The air cycle machine compressor 126 is in airflow communication with the first duct 122 for receiving the compressed ECS airflow, and is configured to further compress the ECS airflow and provide such ECS airflow to the air cycle machine turbine 128 through a second duct 132 of the ECS 102.

As will further be appreciated from FIG. 2, the exemplary ECS 102 depicted further includes a second heat exchanger 134 in thermal communication with the second duct 132 for adding additional heat to the ECS airflow downstream of the air cycle machine compressor 126 and upstream of the air cycle machine turbine 128.

The air cycle machine turbine 128 is in airflow communication with the second duct 132 for receiving the ECS airflow and expanding the ECS airflow, reducing a pressure and a temperature of the ECS airflow. The air cycle machine turbine 128 is in airflow communication with the cabin airflow delivery system 108 for providing the expanded ECS airflow to the cabin airflow delivery system 108 as a cabin inlet airflow.

In the exemplary embodiment depicted, the ECS assembly 100, or rather, the cabin airflow delivery system 108, includes a mixer 136 and the ECS 102 further includes an air cycle machine turbine bypass duct 138 extending from the air cycle machine compressor 126 to the mixer 136, bypassing the air cycle machine turbine 128 and, for the embodiment shown, the second heat exchanger 134. The mixer 136 is configured to receive airflow from the air cycle machine turbine bypass duct 138 and incorporate such airflow into the cabin inlet airflow.

A turbine bypass valve 140 is in airflow communication with the air cycle machine turbine bypass duct 138 for modulating an airflow therethrough. As will be appreciated, by modulating the amount of airflow through the air cycle machine turbine bypass duct 138, temperature and pressure regulation of the cabin inlet airflow may be accomplished. For example, as will be appreciated, the airflow through the air cycle machine turbine bypass duct 138 may be at a higher pressure and temperature than the airflow provided from the air cycle machine turbine 128 to the cabin airflow delivery system 108.

In addition, for the embodiment shown, it will be appreciated that the ECS assembly 100 further includes a recirculation airflow path 142 and a recirculation fan 144 (or recirculation compressor). The recirculation airflow path 142 is in airflow communication with cabin 42 for receiving a portion of the cabin exhaust airflow and further is in airflow communication with the mixer 136 for providing the portion of the cabin exhaust airflow to the mixer 136. The recirculation fan 144 is configured to increase a pressure of the portion of the cabin exhaust airflow prior to the portion of the cabin exhaust airflow reaching the mixer 136. The mixer 136 may further be configured to incorporate the portion of the cabin exhaust airflow through the recirculation airflow path 142 back into the cabin inlet airflow prior to the cabin airflow delivery system 108 providing such cabin inlet airflow to the cabin 42.

Referring still to FIG. 2, it will be appreciated that the ECS assembly 100 further includes the cabin exhaust delivery system 110 and a fuel cell assembly 150. The cabin exhaust delivery system 110 is in airflow communication with the cabin 42 of the aircraft 10 for receiving all or a portion of the cabin exhaust airflow and is further in airflow communication with the fuel cell assembly 150 for receiving all or the portion of the cabin exhaust airflow from the cabin exhaust delivery system 110.

In particular, it will be appreciated that the fuel cell assembly 150 generally includes a fuel delivery system 152, an air delivery system, an electric power output 154, and a fuel cell stack 156.

The air delivery system includes the cabin exhaust delivery system 110, which in turn includes a fuel cell inlet line 158 and a fuel cell outlet line 160. The fuel cell inlet line 158 is in fluid communication with the cabin 42 and the fuel cell stack 156 for receiving the cabin exhaust airflow from the cabin 42 and providing such cabin exhaust airflow to the fuel cell stack 156. The fuel cell outlet line 160 is in fluid communication with the fuel cell stack 156 for receiving a fuel cell exhaust airflow from the fuel cell stack 156.

Further, for the embodiment shown, the air delivery system includes a fuel cell bypass line 162 fluidly connecting the fuel cell inlet line 158 to the fuel cell outlet line 160, bypassing the fuel cell stack 156. A fuel cell bypass valve 164 is in airflow communication with the fuel cell bypass line 162 for modulating an amount of airflow through the fuel cell bypass line 162. Modulation of the amount of airflow through fuel cell bypass line 162 may allow for modulation of one or more operating conditions of the fuel cell assembly 150, as will be discussed in more detail below.

Further, it will be appreciated that for the exemplary embodiment depicted, the fuel cell assembly 150 further includes a humidifier 166 in airflow communication with the fuel cell inlet line 158 and the fuel cell outlet line 160. The humidifier 166 may be configured to extract water from the fuel cell exhaust airflow through the fuel cell outlet line 160 and provide such water to the cabin exhaust airflow through the fuel cell inlet line 158 upstream of the fuel cell stack 156. Depending on a chemistry of the fuel cell stack 156, it may be desirable to have the cabin exhaust airflow provided to the fuel cell stack 156 with a threshold level of humidity.

Briefly, it will be appreciated that airflow from the fuel cell outlet line 160 of the cabin exhaust delivery system 110 may further be provided through a turbine 167 connected to the common ECS shaft 130 of the ECS 102. In such a manner, the ECS 102 may be configured to extract remaining energy within such airflow prior to dumping the airflow, e.g., to ambient.

The fuel delivery system 152 of the fuel cell assembly 150 generally includes a fuel source 168, a fuel delivery line 170, and a fuel valve 172. The fuel source 168 may be any aviation fuel or hydrogen. The fuel delivery line 170 extends from the fuel source 168 to the fuel cell stack 156 and the fuel valve 172 is in fluid communication with the fuel delivery line 170 for modulating an amount of fuel flow through the fuel delivery line 170. Modulation of the fuel valve 172 may allow for modulation of one or more operating conditions of the fuel cell assembly 150, as will also be discussed in more detail below.

The fuel delivery system 152 further includes a fuel exhaust line 174 in fluid communication with fuel cell stack 156 for receiving output products of the fuel cell stack 156.

Although not depicted, the fuel cell assembly 150 may include, e.g., one or more fuel reformers in flow communication with the fuel delivery system for generating a hydrogen rich gas for the fuel cell stack 156.

The electric power output 154 is configured to receive electrical power from the fuel cell stack 156 and generally includes a power controller 176. The power controller 176 may include, e.g., power electronics to convert or condition electrical power received from the fuel cell stack 156. For example, the power controller 176 may include a DC/DC converter to convert the electrical power received to a desired current, voltage, or both.

Figure 3:
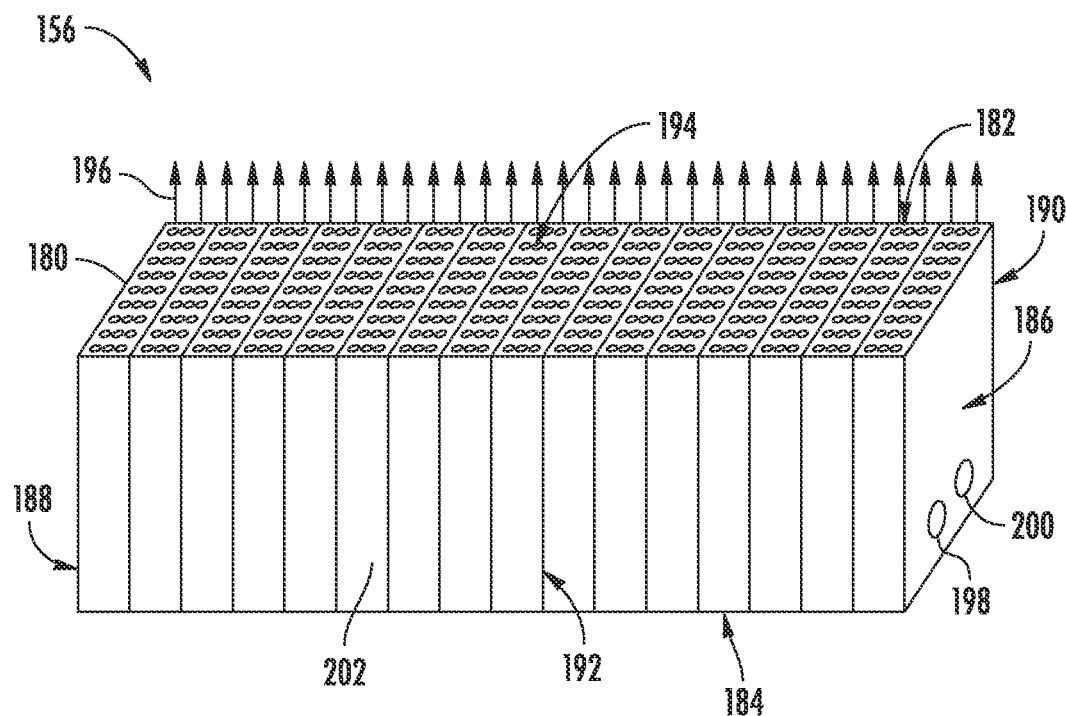
FIG. 3 is a perspective view of a fuel cell stack of a fuel cell assembly of the exemplary environmental control system assembly of FIG. 2.

Moreover, referring now to FIG. 3, a schematic illustration is provided as a perspective view of the fuel cell stack 156 of the fuel cell assembly 150 of FIG. 2.

The fuel cell stack 156 depicted includes a housing 180 having an outlet side 182 and a side 184 that is opposite to the outlet side 182, a fuel and air inlet side 186 and a side 188 that is opposite to the fuel and air inlet side 186, and sides 190, 192. The side 190, the side 188, and the side 184 are not visible in the perspective view of FIG. 3.

As will be appreciated, the fuel cell stack 156 may include a plurality of fuel cells 202 that are "stacked," e.g., side-by-side from one end of the fuel cell stack 156 (e.g., fuel and air inlet side 186) to another end of the fuel cell stack 156 (e.g., side 188). As such, it will further be appreciated that the outlet side 182 includes a plurality of outlets 194, each from a respective fuel cell 202 of the fuel cell stack 156. During operation, output products 196 are directed from the outlets 194 out of the housing 180. As will be appreciated from the description of FIG. 4, below, the outlets 194 include separate fuel outlets (which may be in fluid communication with the fuel exhaust line 174 (see FIG. 2)) and air outlets (which may be in fluid communication with the fuel cell outlet line 160 of the cabin exhaust delivery system 110 (see FIG. 2)).

The fuel and air inlet side 186 includes one or more fuel inlets 198 and one or more air inlets 200. Optionally, one or more of the inlets 198, 200 can be on another side of the housing 180. Each of the one or more fuel inlets 198 is fluidly coupled with the fuel delivery line 170 of the fuel delivery system 152. Each of the one or more air inlets 200 is fluidly coupled with the fuel cell inlet line 158 of the air delivery system.

Figure 4:
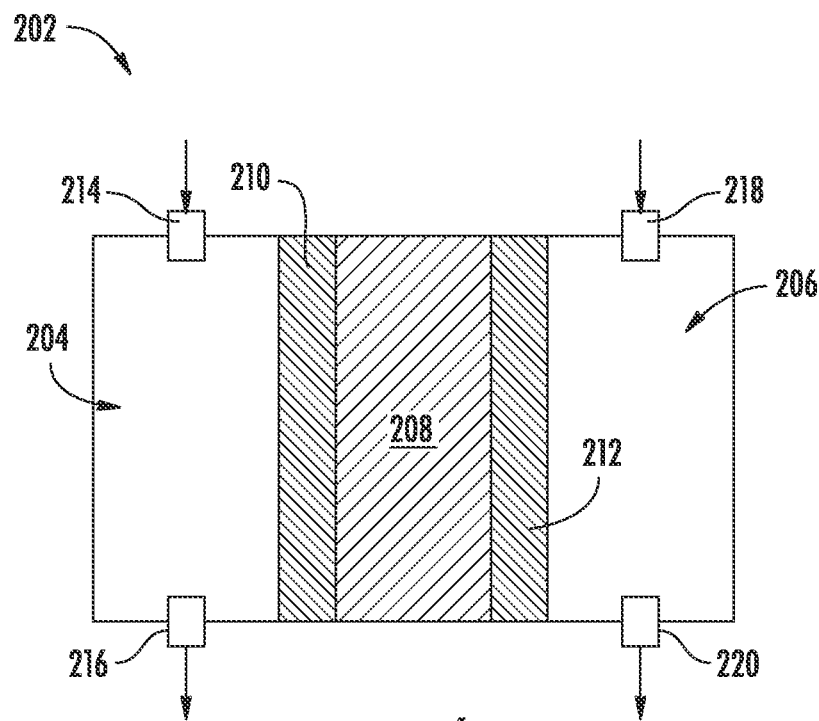
FIG. 4 is a schematic view of a fuel cell of the exemplary fuel cell stack of FIG. 3.

Referring now to FIG. 4, a close-up, schematic view is provided of a fuel cell 202 of the fuel cell stack 156 of FIG. 3. As will be appreciated, fuel cells are electro-chemical devices which may convert chemical energy from a fuel into electrical energy through an electro-chemical reaction of the fuel, such as hydrogen, with an oxidizer, such as oxygen contained in the atmospheric air. Fuel cell systems may advantageously be utilized as an energy supply system because fuel cell systems may be considered environmentally superior and highly efficient when compared to at least certain existing systems. As a single fuel cell, such as the fuel cell 202 depicted in FIG. 4, may only be capable of generating on the order of one (1) volt of power, a plurality of fuel cells may be stacked together to form a fuel cell stack, such as the fuel cell stack 156 of FIG. 3, to generate a desired voltage. The exemplary fuel cell 202 depicted in FIG. 4, and each of the fuel cells 202 of the fuel cell stack 156 of FIG. 3, are configured as proton exchange membrane fuel cells ("PEM fuel cells"), also known as a polymer electrolyte membrane fuel cell. PEM fuel cells have an operating temperature range and operating temperature pressure determined to work well with the conditions described herein.

More specifically as is depicted schematically in FIG. 4, the fuel cell 202 generally includes a cathode side 204, an anode side 206, and an electrolyte layer 208 positioned between the cathode side 204 and the anode side 206. The cathode side 204 may generally include a cathode 210 and the anode side 206 and may generally include an anode 212.

The cathode side 204 includes a cathode inlet 214 and a cathode outlet 216 and the anode side 206 includes an anode inlet 218 and an anode outlet 220. The cathode side 204 of the fuel cell 202, and more specifically, the cathode inlet 214 of the cathode side 204 of the fuel cell 202, is in fluid communication with the cabin exhaust delivery system 110, and more specifically, the fuel cell inlet line 158 of the cabin exhaust delivery system 110 of FIG. 2. The cathode outlet 216 is in fluid communication with the fuel cell outlet line 160 of the cabin exhaust delivery system 110. Similarly, the anode side 206 of the fuel cell 202, and more specifically, the anode inlet 218 of the anode side 206 of the fuel cell 202, is in fluid communication with the fuel delivery line 170 of the fuel delivery system 152. The anode outlet 220 is in fluid communication with the fuel exhaust line 174 of the fuel delivery system 152.

Referring now back to FIG. 2, it will be appreciated that during operation of the ECS assembly 100, the ECS assembly 100 may operate the electric motor 118 to compress and condition the ECS airflow using the initial compressor 116 and air cycle machine 114. The ECS assembly 100 may provide the ECS airflow as the cabin inlet airflow to and through the cabin airflow delivery system 108 to the cabin 42 of the aircraft 10, providing for a pressurization and thermal management of the cabin 42 of the aircraft 10.

The ECS assembly 100 may then provide at least a portion of the cabin exhaust airflow to and through the cabin exhaust delivery system 110 to the fuel cell assembly 150. The fuel cell assembly 150 may utilize the cabin exhaust airflow to generate electric power, in combination with fuel flow provided from the fuel delivery system 152. In such a manner, the fuel cell assembly 150 may be integrated with the ECS 102 to efficiently generate electric power. More specifically, instead of the ECS 102 dumping the cabin exhaust airflow to ambient, the cabin exhaust airflow may be utilized in the useful production of electric power using the fuel cell assembly 150.

As briefly mentioned above, the fuel cell stack 156 may include a plurality of PEM fuel cells, such that the fuel cell assembly 150 may be configured as a PEM fuel cell assembly. The cabin exhaust airflow may be at a temperature and pressure particularly desirable for generating electric power using PEM fuel cells and a PEM fuel cell assembly, such as the fuel cell assembly 150 depicted in FIG. 2 (described also with respect FIGS. 3 and 4). In particular, the cabin exhaust airflow may be at a temperature between 60 degrees C. and 90 degrees C., such as between 70° C. and 80° C. Further, a pressure of the cabin exhaust airflow may be between 60 kilopascals and 100 kilopascals such as between 70 kilopascals and 90 kilopascals. These conditions may be desirable for generating electric power using a PEM fuel cell. Accordingly, by utilizing such airflow, the fuel cell assembly 150 need not use excess power to specifically condition an airflow for the fuel cell assembly 150.

Further, referring still to FIG. 2, it will be appreciated that the fuel cell assembly 150 may be configured to generate electric power to sustain operations of the ECS 102 of the ECS assembly 100, without requiring an electric power source outside of the ECS assembly 100.

In particular, for the embodiment depicted, the electric motor 118, which as noted above is configured to drive operations of the ECS assembly 100, defines a maximum power draw. As used herein, the term "maximum power draw" refers to the maximum amount of electric power required for a particular component during all anticipated non-failure mode and non-emergency mode operations for the particular component.

Further, for the embodiment depicted, the fuel cell assembly 150 defines a maximum power rating. As used herein, the term "maximum power rating" refers to a maximum amount of electric power that may be generated during anticipated operating conditions without pre-maturely wearing or degrading the component. For example, the maximum power rating may refer to the maximum amount of power that the fuel cell assembly 150 may generate during a cruise operation of the aircraft 10 within which it is incorporated.

For the exemplary embodiment depicted, the maximum power rating of the fuel cell assembly 150 is higher than the maximum power draw of the electric motor 118. In such a manner, all of the electric power required for operating the ECS 102 may be provided to the ECS 102 from the fuel cell assembly 150. Such may allow for the ECS assembly 100 to be located at a position within the aircraft 10 remote from one or more power sources without requiring relatively heavy, expensive, and complicated electric communication buses.

It will further be appreciated that in at least certain exemplary aspects, depending on how much higher the maximum power rating of the fuel cell assembly 150 is than the maximum power draw, the fuel cell assembly 150 may further be in communication with an electric power bus 222 of the aircraft 10 for providing excess electric power to the electric power bus 222.

Referring still to FIG. 2, it will be appreciated that the ECS assembly 100 further includes a controller 250. The controller 250 is in operable communication with various aspects of the ECS assembly 100 for controlling certain operations of the ECS assembly 100. For example, the ECS assembly 100 may include one or more sensors for sensing various operating conditions. For example, in the embodiment depicted the ECS assembly 100 includes a fuel cell sensor 253 configured to sense data indicative of various operating parameters of the fuel cell assembly 150, such as of the fuel cell stack 156. For example, the fuel cell sensor 253 may be configured to sense data indicative of a temperature of the fuel cell stack 156, a pressure of one or more flows to, through, from, or around the fuel cell stack 156, a gas composition of various flows to, through, from, or around the fuel cell stack 156, etc. In addition, the ECS assembly 100 includes a cabin exhaust airflow sensor 254 configured to sense data indicative of the cabin exhaust airflow through the cabin exhaust delivery system 110, such as, e.g., a flow rate of the cabin exhaust airflow, a pressure of the cabin exhaust airflow, a temperature of the cabin exhaust airflow, a gas composition of the cabin exhaust airflow, etc. Further, still, the ECS assembly 100 includes a cabin sensor 256 for sensing data indicative of an environment within the cabin 42, such as, e.g., a temperature within the cabin 42, a gas composition within the cabin 42, a pressure within the cabin 42, etc.

In the embodiment depicted, the controller 250 is operably coupled to these sensors 252, 254, 256 and various other components of the ECS assembly 100 to control various aspects of the ECS assembly 100. For example, in the embodiment shown, the controller 250 is further in operable communication with the power controller 176 of the fuel cell assembly 150, the electric motor 118 of the ECS 102, the turbine bypass valve 140, the fuel cell bypass valve 164, and the fuel valve 172 of the fuel cell assembly 150.

Figure 5:
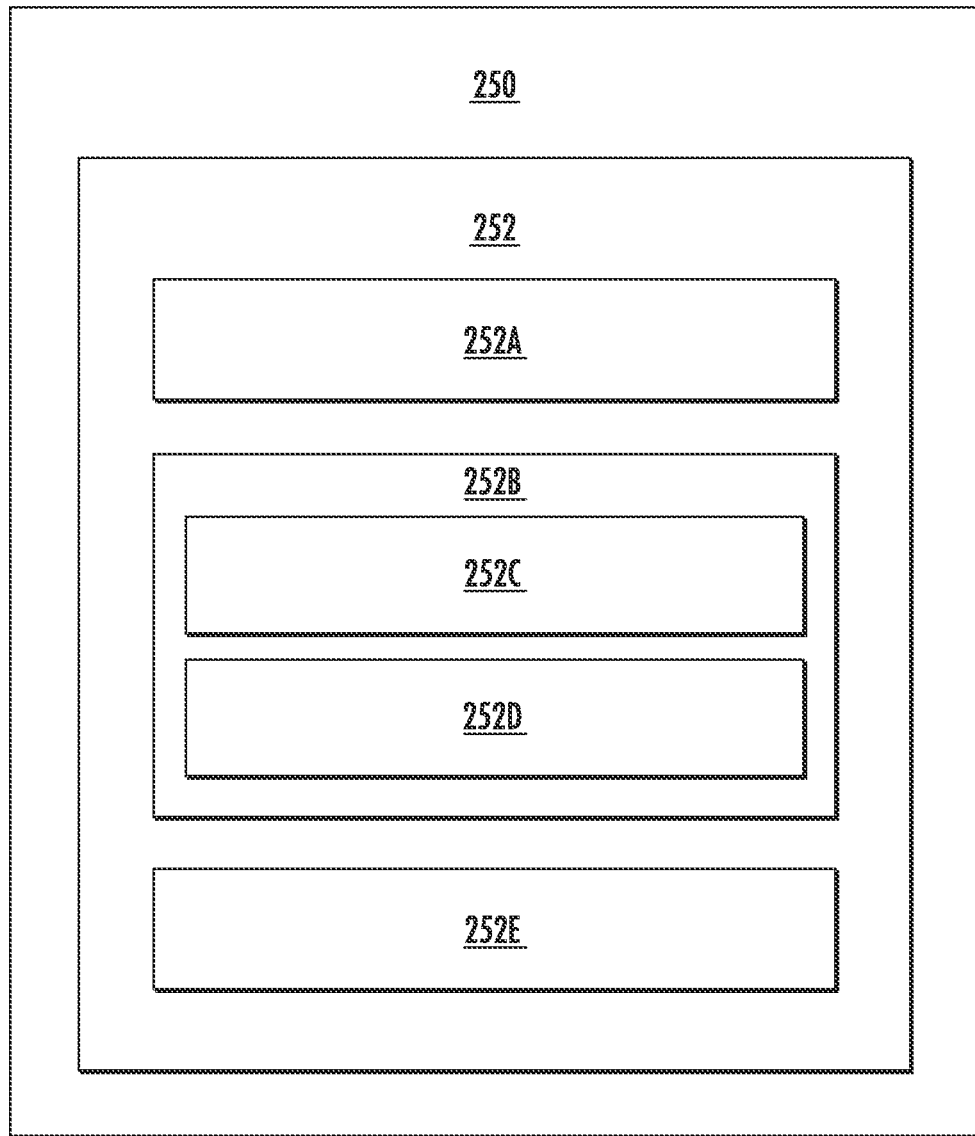
FIG. 5 is a schematic view of a controller in accordance with an exemplary embodiment of the present disclosure.

Referring now to FIG. 5, a schematic view is provided of the exemplary controller 250 of the ECS assembly 100 of FIG. 2. As noted, the exemplary controller 250 is configured to receive the data sensed from the one or more sensors (e.g., sensors 252, 254, 256) and, e.g., may make control decisions for the ECS assembly 100 based on the data received from the one or more sensors.

In one or more exemplary embodiments, the controller 250 depicted in FIG. 5 may be a stand-alone controller for the ECS assembly 100, or alternatively, may be integrated into one or more other controllers, such as a controller for an aircraft 10 with which the ECS assembly 100 is integrated (e.g., aircraft controller 50 of FIG. 1), etc.

Referring particularly to the operation of the controller 250, in at least certain embodiments, the controller 250 can include one or more computing device(s) 252. The computing device(s) 252 can include one or more processor(s) 252A and one or more memory device(s) 252B. The one or more processor(s) 252A can include any suitable processing device, such as a microprocessor, microcontroller, integrated circuit, logic device, and/or other suitable processing device. The one or more memory device(s) 252B can include one or more computer-readable media, including, but not limited to, non-transitory computer-readable media, RAM, ROM, hard drives, flash drives, and/or other memory devices.

The one or more memory device(s) 252B can store information accessible by the one or more processor(s) 252A, including computer-readable instructions 252C that can be executed by the one or more processor(s) 252A. The instructions 252C can be any set of instructions that when executed by the one or more processor(s) 252A, cause the one or more processor(s) 252A to perform operations. In some embodiments, the instructions 252C can be executed by the one or more processor(s) 252A to cause the one or more processor(s) 252A to perform operations, such as any of the operations and functions for which the controller 250 and/or the computing device(s) 252 are configured, the operations for operating an ECS assembly 100 and/or fuel cell assembly 150 (e.g., method 280, method 400), as described herein, and/or any other operations or functions of the one or more computing device(s) 252. The instructions 252C can be software written in any suitable programming language or can be implemented in hardware. Additionally, and/or alternatively, the instructions 252C can be executed in logically and/or virtually separate threads on the one or more processor(s) 252A. The one or more memory device(s) 252B can further store data 252D that can be accessed by the one or more processor(s) 252A. For example, the data 252D can include data indicative of power flows, data indicative of engine/aircraft 10 operating conditions, and/or any other data and/or information described herein.

The computing device(s) 252 can also include a network interface 252E used to communicate, for example, with the other components of the ECS assembly 100, the aircraft 10 incorporating the ECS assembly 100, etc. For example, in the embodiment depicted, as noted above, the ECS assembly 100 includes one or more sensors for sensing data indicative of one or more parameters of the ECS assembly 100. The controller 250 of the ECS assembly 100 is operably coupled to the one or more sensors through, e.g., the network interface 252E, such that the controller 250 may receive data indicative of various operating parameters sensed by the one or more sensors during operation. Further, for the embodiment shown the controller 250 is operably coupled various aspects of the ECS assembly 100, as noted above, e.g., through the network interface 252E. In such a manner, the controller 250 may be configured control various aspects of the ECS assembly 100 in response to, e.g., the data sensed by the one or more sensors.

The network interface 252E can include any suitable components for interfacing with one or more network(s), including for example, transmitters, receivers, ports, controller 250, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 6:
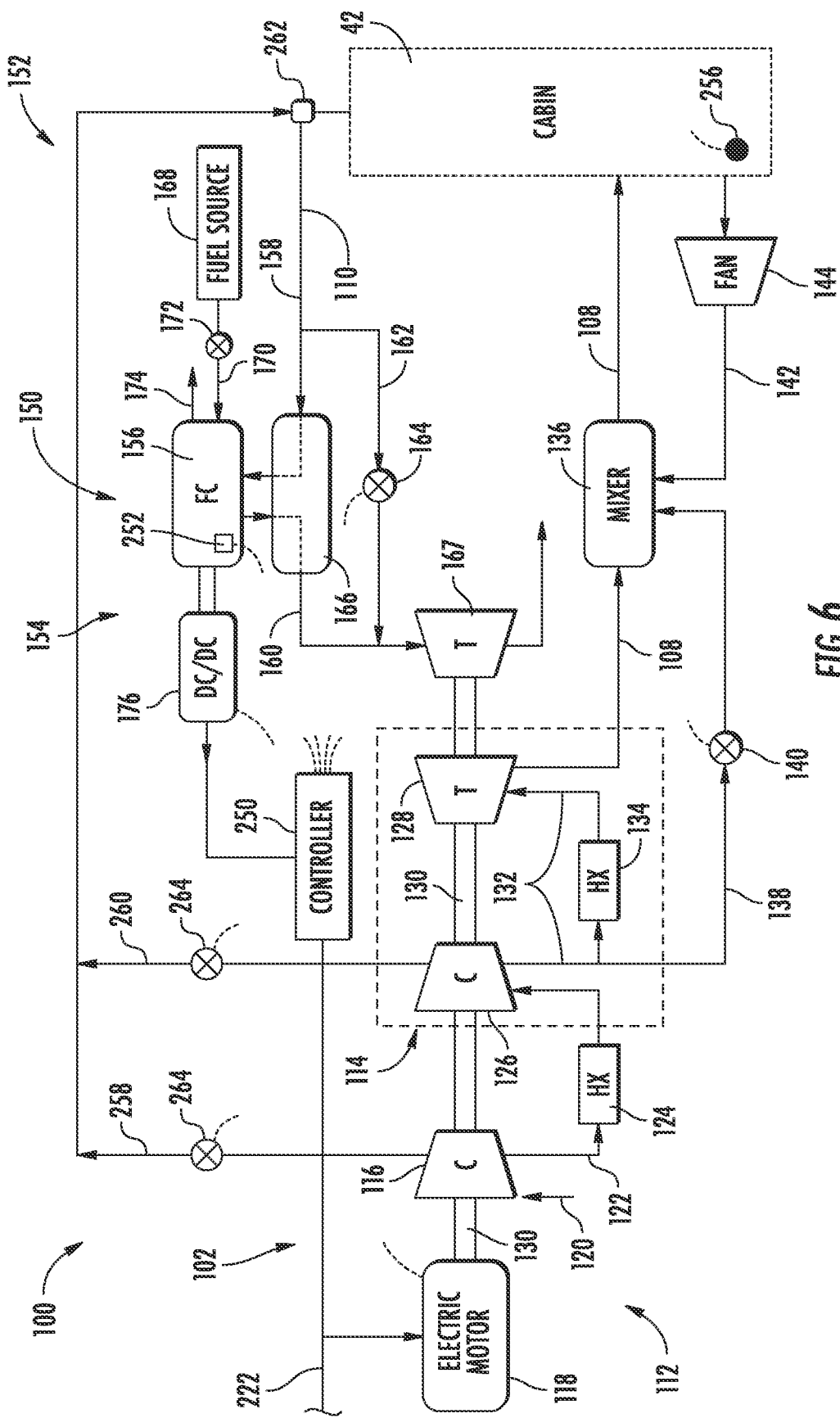
FIG. 6 is a schematic diagram of an environmental control system assembly in accordance with another exemplary embodiment of the present disclosure.

It will be appreciated, however, that the exemplary ECS assembly 100 depicted in FIG. 2 is provided by way of example only. In other exemplary embodiments, the ECS assembly 100, and various aspects of ECS assembly 100, may be configured in any other suitable manner. For example, referring now to FIG. 6, a schematic, flow diagram is provided of an ECS assembly 100 in accordance with another exemplary aspect of the present disclosure. The exemplary ECS assembly 100 of FIG. 6 may be configured in substantially the same manner as exemplary ECS assembly 100 of FIG. 2. Accordingly, the same or similar numbers may refer to the same or similar parts.

As depicted, the ECS assembly 100 generally includes an ECS 102 and a fuel cell assembly 150. The ECS 102 generally includes a compressed airflow source 112 and an air cycle machine 114. The compressed airflow source 112 is configured as an initial compressor 116 and an electric motor 118 for driving the initial compressor 116. The air cycle machine 114 includes an air cycle machine compressor 126. In the embodiment shown, the fuel cell assembly 150 is configured to receive a cabin exhaust air flow through a cabin exhaust delivery system 110 from a cabin 42 of an aircraft 10 (see FIG. 1).

However, for the embodiment depicted, the fuel cell assembly 150 is further in airflow communication with a compressor of the ECS 102, and more specifically, is in airflow communication with the initial compressor 116 and the air cycle machine compressor 126 of the ECS 102. For example, the ECS assembly 100 depicted includes an initial compressor bleed duct 258 and an air cycle machine compressor bleed duct 260, each in flow communication with a mixer valve 262 of the cabin exhaust delivery system 110.

Notably, for the embodiment shown, the ECS assembly 100 further includes a first bleed duct valve 264 in fluid communication with the in the initial compressor bleed duct 258 and a second bleed duct valve 266 in fluid communication with the air cycle machine bleed duct 260. The first bleed duct valve 264 and the second bleed duct valve 266 are each in operable communication with a controller 250 of the ECS assembly 100.

Such a configuration may allow for, e.g., greater power generation during certain operating conditions, temperature and flow control of an airflow to the fuel cell assembly 150, etc. Moreover, inclusion of one or both of the initial compressor bleed duct 258 (and the first bleed duct valve 264) and an air cycle machine compressor bleed duct 260 (and the second bleed duct valve 266) may avoid or alleviate a surge through the initial compressor 116 and/or air cycle machine 114 in the event other anti-surge means (such as a variable diffuser that controls the airflow which is compressed mechanically at the air intake to pass through the compressor, an Add Heat Valve (AHV) that controls the temperature of the airflow to pass through the compressor, etc.) have reached, or are approaching, their performance limits.

Further, in other exemplary embodiments, still other configurations may be provided for the ECS assembly 100. For example, referring now to FIG. 7, a schematic, flow diagram is provided of an ECS assembly 100 in accordance with yet another exemplary aspect of the present disclosure. The exemplary ECS assembly 100 of FIG. 7 may be configured in substantially the same manner as exemplary ECS assemblies 100 of FIG. 2 or 6. Accordingly, the same or similar numbers may refer to the same or similar parts.

As depicted, the ECS assembly 100 generally includes an ECS 102 and a fuel cell assembly 150. The ECS 102 generally includes a compressed airflow source 112 and an air cycle machine 114. The compressed airflow source 112 is configured as an initial compressor 116 and electric motor 118. The air cycle machine 114 includes an air cycle machine compressor 126. In the embodiment shown, a cabin airflow delivery system 108 is provided in airflow communication with the ECS 102 and a cabin 42 for providing a cabin inlet airflow from the ECS 102 to the cabin 42. Further, a cabin exhaust delivery system 110 is provided in airflow communication with the cabin 42 and the fuel cell assembly 150 for providing a cabin exhaust airflow from the cabin 42 to the fuel cell assembly 150. The fuel cell assembly 150 is configured to receive a cabin exhaust airflow through the cabin exhaust delivery system 110 from the cabin 42 of an aircraft 10 (see FIG. 1).

Figure 7:
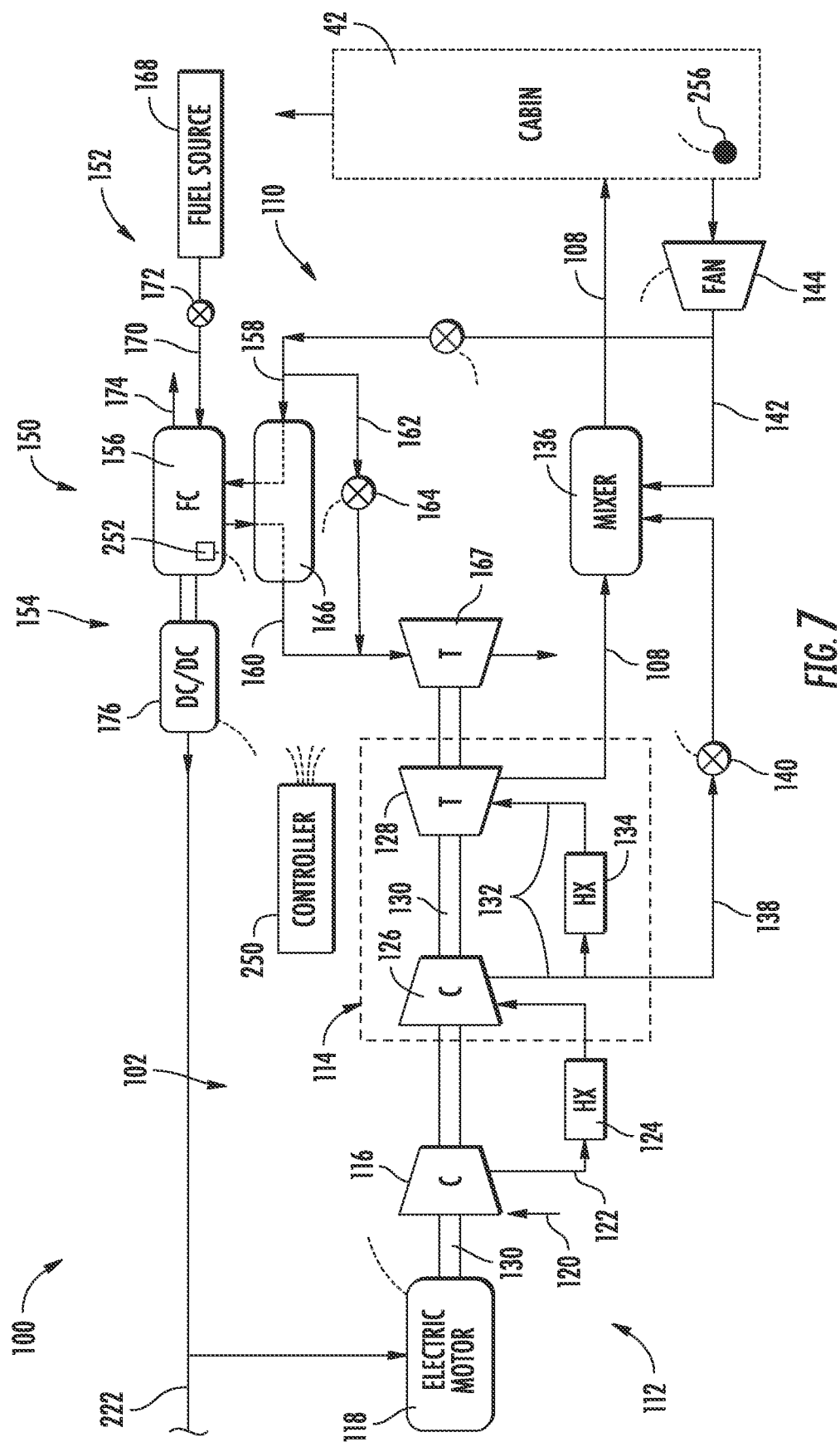
FIG. 7 is a schematic diagram of an environmental control system assembly in accordance with yet another exemplary embodiment of the present disclosure.

However, for the exemplary embodiment of FIG. 7, the cabin exhaust delivery system 110 includes a recirculation fan 144 in airflow communication with the cabin exhaust delivery system 110 and the recirculation flowpath 142. The recirculation fan 144 is configured for increasing a pressure of an air flow therethrough at a location upstream of the fuel cell assembly 150, and the recirculation flowpath 142 extends from the cabin exhaust delivery system 110 from a location downstream of the recirculation fan 144. The recirculation airflow path 142 extends from the cabin exhaust delivery system 110 to the mixer 136 of the cabin airflow delivery system 108.

Notably, with such exemplary embodiment, the ECS assembly 100 may further include an exhaust from the cabin 42 to ambient (not labeled). Further, although not depicted in the exemplary embodiment of FIG. 7, the ECS assembly 100 may additionally include a second cabin exhaust delivery system (independent of the cabin exhaust delivery system 110) with a separate fuel cell assembly in airflow communication therewith (e.g., a combination of the embodiments of FIG. 2 or 6 with the embodiment of FIG. 7).

Figure 8:
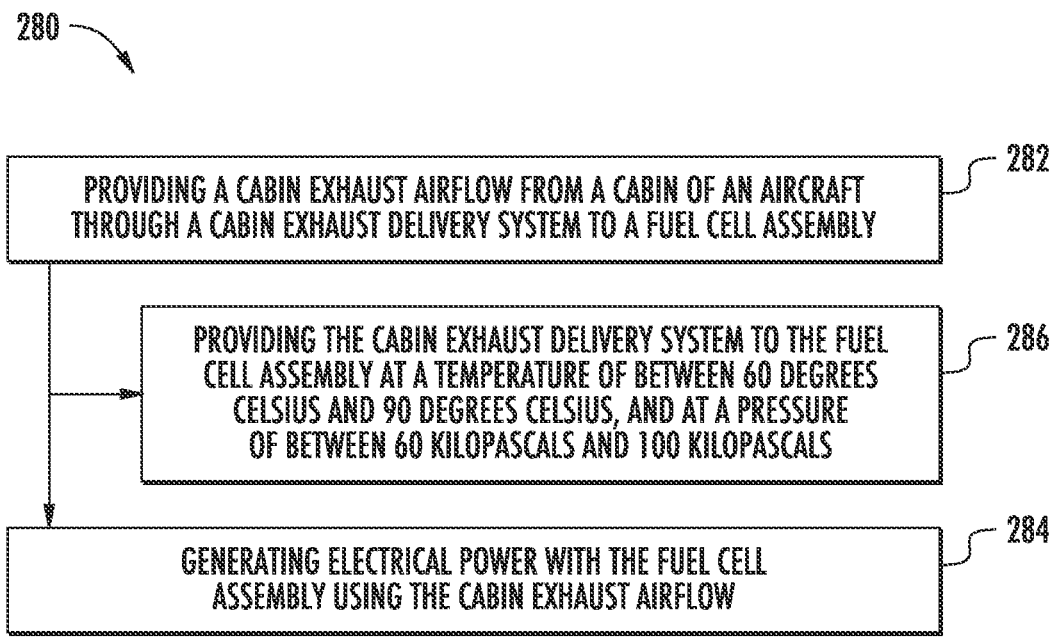
FIG. 8 is a flow diagram of a method of operating an environmental control system assembly in accordance with an exemplary aspect of the present disclosure.

Referring now to FIG. 8, a flow diagram of a method 280 of operating a fuel cell assembly is provided. The method 280 may be utilized with one or more of the exemplary fuel cell assemblies 150 (and ECS assemblies 100) described hereinabove.

The method includes at (282) providing a cabin exhaust airflow from a cabin of an aircraft through a cabin exhaust delivery system to a fuel cell assembly.

The method 282 further includes at (284) generating electrical power with the fuel cell assembly using the cabin exhaust airflow.

In at least certain exemplary aspects, providing the cabin exhaust airflow from the cabin of the aircraft through the cabin exhaust delivery system to the fuel cell assembly at (282) includes at (286) providing the cabin exhaust delivery system to the fuel cell assembly at a temperature of between 60 degrees Celsius and 90 degrees Celsius, and at a pressure of between 60 kilopascals and 100 kilopascals.

The method 282 may further incorporate various other aspects of an ECS assembly/ies 100 described herein and may perform various other operations for which the ECS assembly/ies 100 described herein are configured to perform.

Figure 9:
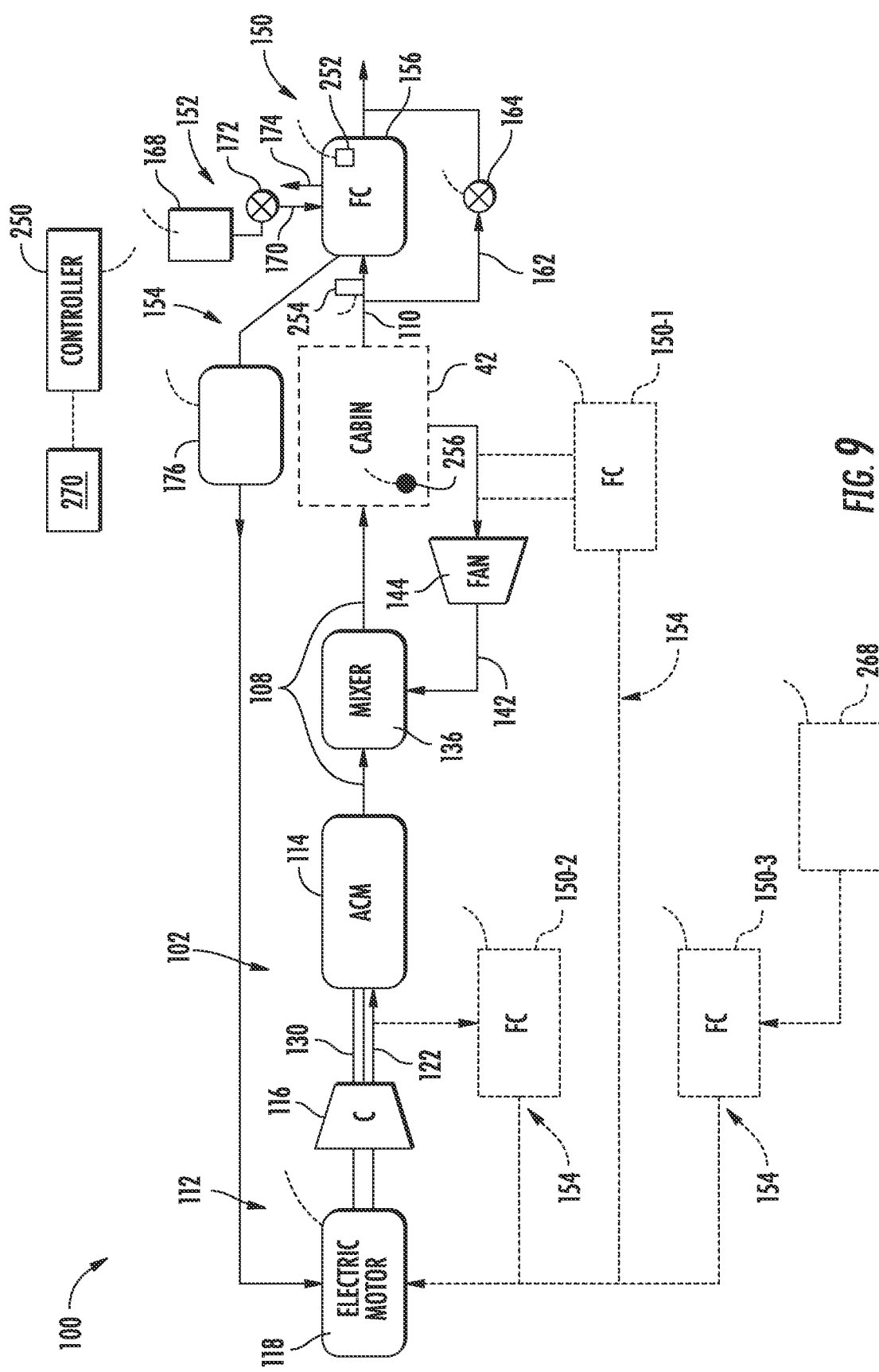
FIG. 9 is a schematic diagram of an environmental control system assembly in accordance with another exemplary embodiment of the present disclosure.

Referring now to FIG. 9, an ECS assembly 100 for an aircraft 10 in accordance with another exemplary aspect of the present disclosure is provided. The exemplary ECS assembly 100 of FIG. 9 may be configured in a similar manner as exemplary ECS assembly 100 described above with reference to FIG. 2, and may be incorporated into an aircraft 10 configured in a similar manner as exemplary aircraft 10 of FIG. 1.

For example, the exemplary ECS assembly 100 generally includes an ECS 102. The ECS 102 generally includes a compressed airflow source 112 and an air cycle machine 114. In the embodiment shown, the compressed airflow source 112 includes an initial compressor 116 and an electric motor 118 drivingly coupled to the initial compressor 116. The initial compressor 116 is configured to receive an ECS inlet airflow, which may be a ram airflow (see, e.g., ram airflow 104 of FIG. 1), and compress the ECS inlet airflow. The compressed ECS inlet airflow is then provided to the air cycle machine 114 as an ECS airflow. The air cycle machine 114, depicted schematically, may include an air cycle machine compressor and an air cycle machine turbine (not shown, see, e.g., air cycle machine compressor 126 and air cycle machine turbine 128 of FIG. 2). The initial compressor 116, the air cycle machine compressor, and the air cycle machine turbine may each coupled to a common ECS shaft 130 (see, e.g., FIG. 2), with the ECS shaft 130 rotatable with, or rather rotatable by, the electric motor 118. The initial compressor 116 and the air cycle machine compressor may be referred to collectively as a compressor section of the ECS 102.

Notably, as discussed above with reference to FIG. 2, the compressed airflow source 112 may alternatively be configured to receive a bleed airflow from an engine. In such a configuration, the compressed airflow source 112 (also referred to herein as an airflow conditioner) may include a pressure reducer (e.g., an expansion turbine) to reduce a pressure of the bleed airflow received from the engine.

Moreover, for the embodiment depicted, the ECS assembly 100 includes a cabin airflow delivery system 108 in airflow communication with the ECS 102 for receiving a cabin inlet airflow from the ECS 102 and providing such cabin inlet airflow to the cabin 42 of the aircraft 10 (see FIG. 1). At least a portion of a cabin exhaust airflow from the cabin 42 of the aircraft 10 may be recycled through a recirculation airflow path 142 and provided back to a mixer in airflow communication with the cabin airflow delivery system 108. For the embodiment shown, a recirculation fan 144 is positioned in airflow communication with the recirculation airflow path 142 for increasing a pressure of the airflow through the recirculation airflow path 142.

Further, for the embodiment depicted, the ECS assembly 100 additionally includes a fuel cell assembly 150. The fuel cell assembly 150 is in electrical communication with the ECS 102 for providing electrical power to the ECS 102. More specifically, for the embodiment depicted, the fuel cell assembly 150 includes a fuel cell stack 156 and an electric power output 154 in electrical communication with the fuel cell stack 156 and further in electrical communication with the electric motor 118 of the ECS 102. In the embodiment depicted, the fuel cell assembly 150 includes a power controller 176. The power controller 176 may include, e.g., power electronics to convert or condition electrical power received from the fuel cell stack 156. For example, the power controller 176 may include a DC/DC converter to convert the electrical power received to a desired current, voltage, or both.

Further, for the embodiment depicted, the fuel cell assembly 150 includes a fuel source 168 configured to provide a fuel flow to the fuel cell stack 156, and further includes a fuel exhaust line 174.

Moreover, for the embodiment depicted, the fuel cell stack 156 is configured to receive an airflow from the ECS 102. More specifically, the ECS assembly 100 further includes a cabin exhaust delivery system 110 in airflow communication with the cabin 42 of the aircraft 10 for receiving a cabin exhaust airflow from the cabin 42 of the aircraft 10. In the embodiment depicted, the fuel cell assembly 150, and more specifically, the fuel cell stack 156 of the fuel cell assembly 150, is in airflow communication with the cabin exhaust delivery system 110 for receiving at least a portion of the cabin exhaust airflow from the cabin 42 of the aircraft 10. In the embodiment depicted, the ECS assembly 100 includes a fuel cell bypass line 162 in airflow communication with the cabin exhaust delivery system 110 allowing at least a portion of the cabin exhaust airflow to be bypassed around the fuel cell stack 156 of the fuel cell assembly 150. The fuel cell assembly 150 further includes a fuel cell bypass valve 164 in airflow communication with the fuel cell bypass line 162 to, e.g., facilitate a control of an airflow to the fuel cell stack 156 of the fuel cell assembly 150.

It will be appreciated, however, that in other exemplary embodiments of the present disclosure, the fuel cell assembly 150 may be in airflow communication with the ECS 102 in any other suitable manner. For example, as is depicted in phantom, in other exemplary embodiments, a fuel cell stack of a fuel cell assembly 150-1 may be in airflow communication with the recirculation airflow path 142 for receiving a recirculation airflow from the cabin 42, upstream of the mixer 136. Additionally, or alternatively, in other exemplary embodiments, as is also depicted in phantom, a fuel cell stack of a fuel cell assembly 150-2 may be in airflow communication with the compressor section of the ECS 102 for receiving a pressurized airflow from the ECS 102. Further, in still other exemplary embodiments, a fuel cell stack of a fuel cell assembly 150-3 may not be in airflow communication with the ECS 102, and as is again depicted in phantom, the fuel cell assembly 150 may include a fuel cell stack configured to receive an airflow from an airflow source 268 separate from the ECS 102.

Referring still to FIG. 9, it will be appreciated that the ECS assembly 100 further includes a controller 250 operably connected to the fuel cell assembly 150. More specifically, the controller 250 may be operable to modify an operating condition of the fuel cell assembly 150. In particular, the controller 250 may be operably connected to the fuel source 168 of the fuel cell assembly 150 for controlling a fuel flow to the fuel cell stack 156, may be operably connected to an air source of the fuel cell assembly 150 for controlling an airflow to the fuel cell stack 156 (e.g., in the embodiment of FIG. 9, the controller 250 is operably connected to the fuel cell bypass valve 164), may be operably connected to the electric power output 154 (e.g., the power controller 176) of the fuel cell assembly 150 for controlling a power output (e.g., a current output) of the fuel cell stack 156, etc.

As will be appreciated, in such a manner, the controller 250 may be operable to modify a fuel cell temperature of the fuel cell assembly 150, a current output of the fuel cell assembly 150, a fuel utilization of the fuel cell assembly 150, an air utilization of the fuel cell assembly 150, or any combination thereof.

As is also depicted in FIG. 9, it will be appreciated that the controller 250 may be configured to receive data from a source 270 outside of the ECS assembly 100. The source 270 may be, e.g., an aircraft controller 50 of the aircraft 10 within which the ECS assembly 100 is in incorporated (see FIG. 1), a ground data source, etc.

In particular, for the embodiment depicted, the controller 250 is operably connected to the fuel cell assembly 150, and more specifically, is operable to modulate an amount of power generated by the fuel cell assembly 150 and provided to the ECS 102 (from the fuel cell assembly 150) based on load forecasting data from an ECS load forecasting module of the controller 250. The load forecasting data may be indicative of an anticipated electrical load that will be required by the ECS 102. In such a manner, the controller 250 may allow for the fuel cell assembly 150 to generate and provide an amount of power that will be required by the ECS 102 for an amount of time in the future. Such may reduce or eliminate a lag between a power being generated by the fuel cell assembly 150 and a power being needed by the ECS 102 to operate in a desired manner.

Figure 10:
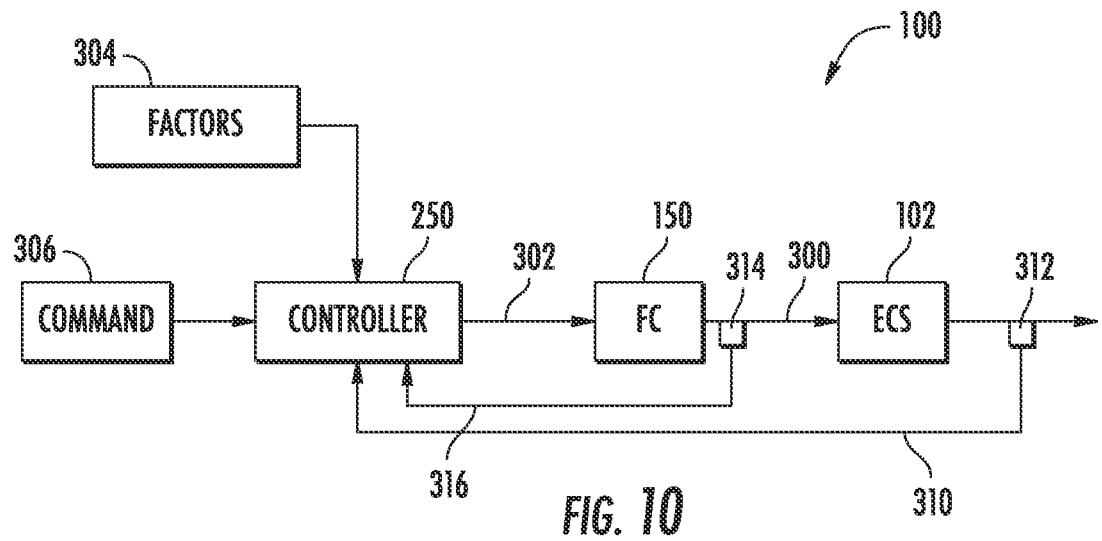
FIG. 10 is a schematic diagram of a control scheme for environmental control system assembly in accordance with another exemplary embodiment of the present disclosure.

In particular, referring now to FIG. 10, a schematic view is provided of an ECS assembly 100 in accordance with an exemplary aspect of the present disclosure. The ECS assembly 100 of FIG. 10 may be configured in a similar manner as the exemplary ECS assembly 100 described above with reference FIG. 9. For example, as is depicted, the ECS assembly 100 generally includes an ECS 102, a fuel cell assembly 150 in electrical communication with the ECS 102 for providing electrical power 300 to the ECS 102, and a controller 250 operably connected to the fuel cell assembly 150 for providing an operating condition command 302 to the fuel cell assembly 150. The controller 250 is generally configured to receive one or more load forecasting factors 304. Moreover, for the embodiment depicted, the controller 250 may be configured to receive a command 306, such as a command from an aircraft controller 50 (see FIG. 1) to operate in a prescribed manner in response to an operating condition of the aircraft 10 (e.g., taxi, takeoff, climb, cruise, descent, etc.). For example, the command 306 may be a command to operate the fuel cell assembly 150 at a power level commensurate with an operating condition of the aircraft 10.

The controller 250 is configured to receive the one or more load forecasting factors 304 and determine load forecasting data. Based on the load forecasting data, the controller 250 is configured to send a signal to the fuel cell assembly 150 to control an amount of power generated by the fuel cell assembly 150 (the operating condition command 302). The fuel cell assembly 150 is configured to operate according to the operating condition command 302 and provide the electrical power 300 to the ECS 102. The ECS assembly 100 is further configured to provide a feedback signal 310 back to the controller 250 indicative of an operating condition of the ECS 102. The feedback signal 310 may be received by the controller 250 and the controller 250 may modify the operating condition command 302 sent to the fuel cell assembly 150 in response to the feedback signal 310 indicative of actual operating conditions of the ECS 102. In particular, the ECS assembly 100 includes an ECS sensor 312 configured to sense data provided to the controller 250 as the feedback signal 310.

A feedback signal 316 is provided to the controller 250 indicative of the one or more operating conditions of the fuel cell assembly 150. The feedback signal 316 may be received by the controller 250 and the controller 250 may modify the operating condition command 302 sent to the fuel cell assembly 150 in response to the feedback signal 316 indicative of actual operating conditions of the fuel cell assembly 150. In particular, the fuel cell assembly 150 further includes a fuel cell assembly sensor 314 configured to sense data indicative of one or more operating conditions of the fuel cell assembly 150, the data provided to the controller 250 as the feedback signal 316.

The data sensed by the ECS sensor 312 indicative of the operating conditions of the ECS 102 may include data indicative of, e.g., a rotational speed of one or more components of the ECS 102, a temperature of an airflow provided to a cabin 42 of the aircraft 10 (see FIG. 1), a flow rate of the air flow provided to the cabin 42 of the aircraft 10 (see FIG. 1), etc.

The data sensed by the fuel cell sensor 314 indicative of the operating conditions of the fuel cell assembly 150 may include data indicative of, e.g., a temperature, humidity, flowrate, pressure, electrical current, electrical voltage of the fuel cell assembly 150.

In such a manner, it will be appreciated that the controller 250 may be operable to modulate the amount of power generated by the fuel cell assembly 150 and provided to the ECS 102 based on a feedback control scheme, a feedforward control scheme, or both. As used herein, the term "feedback control scheme" refers to a system which tends to maintain a prescribed relationship of one system variable to another by comparing functions of these variables and using the difference as a means of control. Further, as used herein, the term "feedforward control scheme" refers to a system that that passes a controlling signal from a source in its external environment to a load elsewhere in its external environment.

More specifically, for the embodiment shown, the controller 250 is operable to modulate the amount of power generated by the fuel cell assembly 150 and provided to the ECS 102 based on a feedback control scheme.

Figure 11:
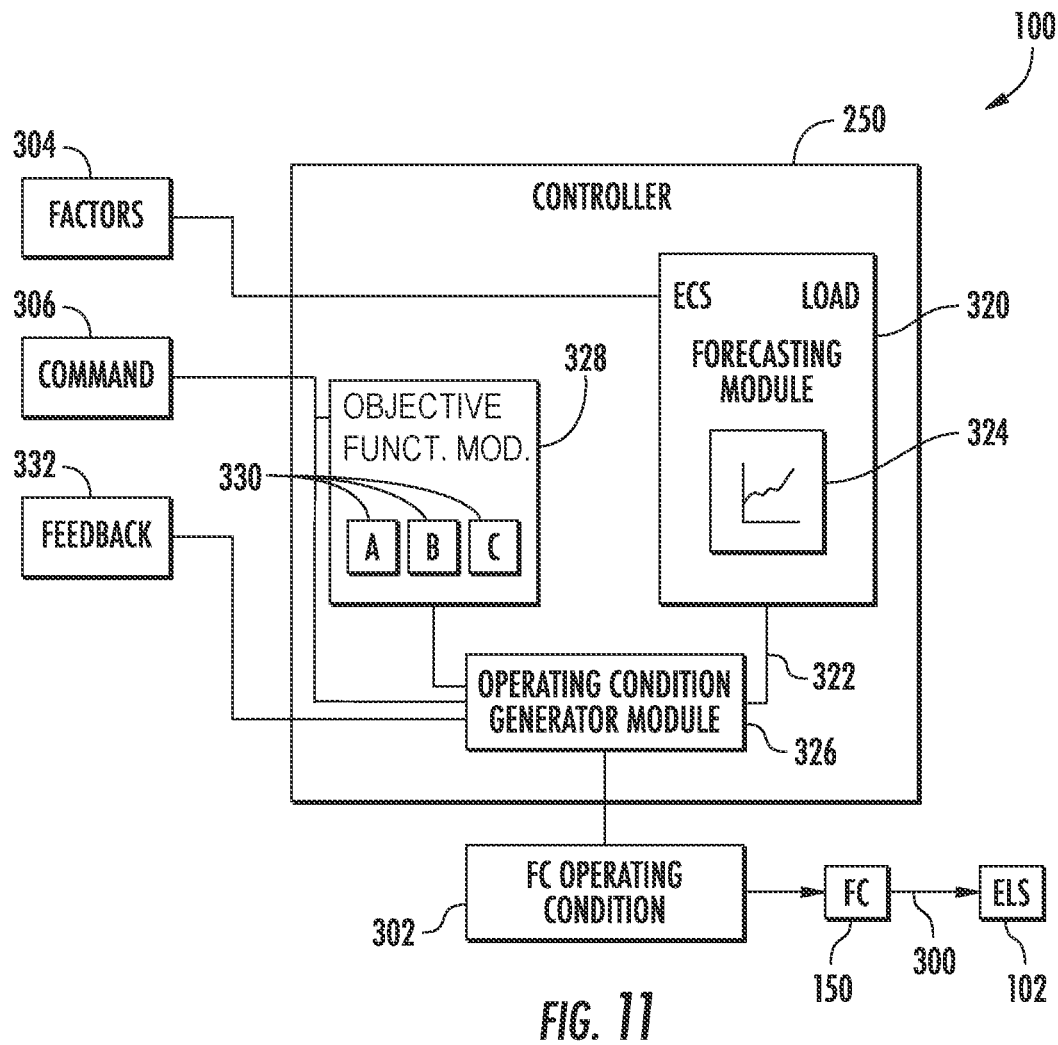
FIG. 11 is a schematic diagram of an environmental control system assembly in accordance with an exemplary embodiment of the present disclosure.

More particularly, referring now to FIG. 11, a schematic view is depicted of a controller 250 of an ECS assembly 100 in accordance with an exemplary aspect of the present disclosure is provided. The controller 250 and ECS assembly 100 may be configured in a similar manner as one or more of the controllers 250 and ECS assemblies 100 described above with reference to, e.g., FIGS. 9 and 10.

In particular, it will be appreciated that the controller 250 generally includes an ECS load forecasting module 320. Further, the controller 250 is configured to receive data from one or more external sources and is configured to provide such data to the ECS load forecasting module 320 to generate load forecasting data 322 of the ECS 102. The load forecasting data 322 of the ECS 102 may include data indicative of an anticipated electrical load of the ECS 102, as described further below. For example, in the embodiment depicted, the ECS load forecasting module 320 is configured to receive one or more load forecasting factors 304.

The ECS load forecasting module 320 may utilize the load forecasting factors 304 to determine the load forecasting data 322. In particular, in the embodiment depicted the ECS load forecasting module 320 includes a load forecasting model 324, which may include, e.g., one or more data driven models (such as neural network, fuzzy logic, a lookup table, or any combination thereof), or the like. The ECS load forecasting module 320 may receive the load forecasting factors 304, and may utilize the load forecasting model 324 with the load forecasting factors 304 to determine the load forecasting data 322 of the ECS 102.

The one or more load forecasting factors 304 may be, e.g., a passenger number for an aircraft 10 incorporating ECS assembly 100 having the controller 250 (see, e.g., FIG. 1). The passenger number refers to a number of passengers determined to be (or estimated to be) on the aircraft 10 (see FIG. 1) for the current or subsequent flight operation. In such a manner, the ECS load forecasting module 320 may utilize the passenger number for the aircraft 10 (see FIG. 1) to determine the load forecasting data 322 of the ECS 102. As will be appreciated from the description hereinabove, the ECS 102 is operable to provide airflow to the cabin 42 of the aircraft 10 (see FIG. 1) to maintain the cabin 42 of the aircraft 10 at a desired pressure and temperature during a flight operation of the aircraft 10. A primary driver for an amount of airflow needed, and an amount of thermal control for the cabin 42 needed, during a particular flight operation is the number of passengers the aircraft 10 is carrying during the particular flight operation. Accordingly, by receiving this information, the ECS load forecasting module 320, and more specifically, the load forecasting model 324 of the ECS load forecasting module 320, may be operable to relatively accurately determine operating characteristics for the ECS 102 that will be needed during the flight operation, and therefore an amount of electrical power that will be needed to support the ECS 102 operating according to the determined operating characteristics during the flight operation.

Notably, the load forecasting factors 304 may further include weather forecast data for, e.g., the flight operations of the aircraft 10 (see FIG. 1). For example, if ambient temperatures are higher or lower than a baseline temperature, such may affect the amount of thermal control required for the cabin 42 of the aircraft 10 during the flight operations. Further, the load forecasting factors 304 may further include historical data, such as historical data for the flight operations of the aircraft 10. The historical data may further influence the load forecasting data 322 generated by the ECS load forecasting module 320.

The ECS load forecasting module 320 is configured to provide the load forecasting data 322 to an operating condition generator module 326 of the controller 250. The operating condition generator module 326 is configured to determine an operating condition command 302 (labeled "FC Operating Condition" in FIG. 11) for the fuel cell assembly 150 in response to, or based off of, the load forecasting data 322 determined by the ECS load forecasting module 320. The operating condition command 302 is provided to the fuel cell assembly 150 from the controller 250 such that the fuel cell assembly 150 may operate in a desired manner to generate and provide the electrical power 300 to the ECS 102 needed to sustain operation of the ECS 102 as anticipated by the ECS load forecasting module 320.

Notably, for the embodiment depicted, the controller 250 further includes an objective function module 328. The objective function module 328 may be operable between one or more of the following objective functions 330: maximum efficiency, maximum power output, maximum component life, and minimum emissions output. The objective function module 328 is in operable communication with the operating condition generator module 326. The objective function module 328, based on a selected objective function 330, may influence a value of the operating condition command 302 generated by the operating condition generator module 326 to achieve the selected objective function 330.

The controller 250 is further configured to receive data indicative of a command 306. As noted with the embodiment of FIG. 10, the command 306 may be indicative of a baseline power output for the fuel cell assembly 150 based on, e.g., an operating condition of the aircraft 10 (see FIG. 1). In such a case, data from the command 306 may be received by the operating condition generator module 326. Additionally, or alternatively, the command 306 may be a command to select an objective function 330 of the objective function module 328. In such a scenario, data from the command 306 may be received by the objective function module 328.

Further, for the embodiment depicted, the controller 250 is configured to receive feedback data 332. The feedback data 332 may be feedback data of the ECS 102, such as an operating condition of the ECS 102 (see, e.g., feedback signal 310 and ECS sensor 312 of FIG. 10). More specifically, for the embodiment depicted, the operating condition generator module 326 is configured to receive the feedback data 332. The feedback data 332 may influence a value of the operating condition command 302 generated by the operating condition generator module 326.

Utilizing the load forecasting factors 304 and, e.g., the load forecasting model 324, the ECS load forecasting module 320 may define an anticipated forecast timing of at least two minutes ahead and up to five hours ahead. For example, the anticipated forecast timing may be at least five minutes ahead and up to one hour ahead. In such a manner, the controller 250 may be operable to ensure the fuel cell assembly 150 is operating in a desired manner to generate and provide the electrical power 300 to the ECS 102 needed to sustain operation of the ECS 102 as anticipated by the ECS load forecasting module 320.

Accordingly, it will be appreciated that for the exemplary controller 250 depicted in FIG. 11, to modulate the amount of power generated by the fuel cell assembly 150 and provided to the ECS 102, the controller 250 is operable to modify an operating condition of the fuel cell assembly 150 by providing the fuel cell assembly 150 the operating condition command 302. In such a manner, the ECS assembly 100 may be capable of providing a desired amount of electrical power to the ECS 102 to allow the ECS 102 to operate at a desired output level despite a lag in responsiveness of the fuel cell assembly 150 as compared to changes in a power demand of the ECS 102 during certain operating conditions and across certain operating conditions. Such may allow for the ECS assembly 100 to be powered solely by the fuel cell assembly 150, without requiring additional power source(s) in electrical communication with the ECS 102 during operation of the aircraft 10.

Figure 12:
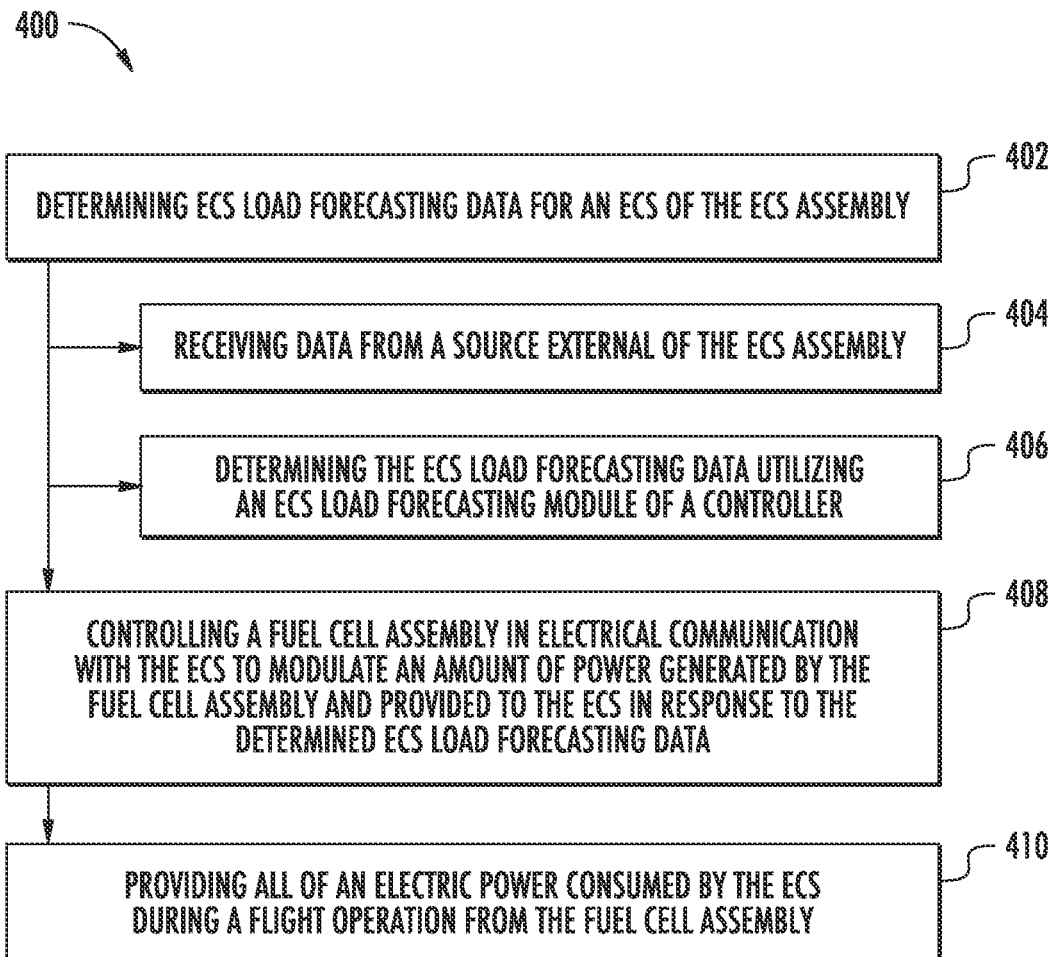
FIG. 12 is a flow diagram of a method of operating an environmental control system assembly in accordance with another exemplary aspect of the present disclosure.

Referring now briefly to FIG. 12, a method 400 of operating an ECS assembly for an aircraft is provided. The method 400 may be utilized with one or more of the exemplary ECS assemblies 100 described above.

The method 400 includes (402) determining ECS load forecasting data for an ECS of the ECS assembly. Determining the ECS load forecasting data for the ECS at (402) includes at (404) receiving data from a source external of the ECS assembly. The data received at (404) may include a passenger number for a flight operation (i.e., a number of passengers within the aircraft during the flight operation). In at least certain exemplary aspects, determining the ECS load forecasting data for the ECS at (402) includes at (406) determining the ECS load forecasting data utilizing an ECS load forecasting module of a controller.

The method 400 further includes at (408) controlling a fuel cell assembly in electrical communication with the ECS to modulate an amount of power generated by the fuel cell assembly and provided to the ECS in response to the determined ECS load forecasting data at (402).

Further, for the exemplary aspect of the method 400 depicted, the method 400 further includes at (410) providing all of an electric power consumed by the ECS during a flight operation from the fuel cell assembly. The flight operation may include an entire flight envelope of a flight of an aircraft. Alternatively, the flight operation may include a segment of the flight envelope, such as a takeoff portion of the flight envelope, a climb portion of the flight envelope, a cruise portion of the flight envelope, a descent portion of the flight envelope, etc.

The method 400 may further incorporate various other aspects of an ECS assembly/ies 100 described herein and may perform various other operations for which the ECS assembly/ies 100 described herein are configured to perform.

Further aspects are provided by the subject matter of the following clauses:

An environmental control system assembly for an aircraft, the assembly comprising: an environmental control system; a cabin airflow delivery system in airflow communication with the environmental control system for receiving a cabin inlet airflow from the environmental control system; a cabin exhaust delivery system configured to be in airflow communication with a cabin of the aircraft for receiving a cabin exhaust airflow when the environmental control system assembly is installed in the aircraft; and a fuel cell assembly in airflow communication with the cabin exhaust delivery system for receiving the cabin exhaust airflow.

The assembly of any preceding clause, wherein the low temperature fuel cell assembly is a polymer exchange membrane fuel cell assembly.

The assembly of any preceding clause, wherein the fuel cell assembly comprises a fuel cell having an anode and a cathode, and wherein the cathode of the fuel cell is in airflow communication with the cabin exhaust delivery system for receiving the cabin exhaust airflow.

The assembly of any preceding clause, wherein the environmental control system comprises an airflow conditioner and an air cycle machine, and wherein the environmental control system assembly further comprises a mixer.

The assembly of any preceding clause, wherein the airflow conditioner is configured to receive an ambient airflow, a bleed airflow from an engine, or both.

The assembly of any preceding clause, wherein the environmental control system further comprises an electric motor drivingly coupled to the compressor and the air cycle machine, wherein the electric motor defines a maximum power draw, wherein the fuel cell assembly defines a maximum power rating, and wherein the maximum power rating is higher than the maximum power draw.

The assembly of any preceding clause, wherein the fuel cell assembly is in electrical communication with the electric motor of the environmental control system for providing electrical power to the electric motor of the environmental control system.

The assembly of any preceding clause, wherein the environmental control system comprises a compressor and an air cycle machine, and wherein the environmental control system assembly further comprises a mixer, wherein the mixer is in airflow communication with cabin airflow delivery system, wherein the environmental control system assembly further comprises a recirculation airflow path extending from the cabin to the mixer.

The assembly of any preceding clause, further comprising: a recirculation fan in airflow communication with the cabin exhaust delivery system, the recirculation airflow path, or both for increasing a pressure of an airflow therethrough.

An aircraft comprising: a body comprising a fuselage and one or more wings, the fuselage defining a cabin; and an environmental control system assembly positioned within the body of the aircraft, the environmental control system assembly comprising: an environmental control system; a cabin airflow delivery system in airflow communication with the environmental control system for receiving a cabin inlet airflow from the environmental control system; a cabin exhaust delivery system configured in airflow communication with the cabin of the aircraft for receiving a cabin exhaust airflow; and a fuel cell assembly in airflow communication with the cabin exhaust delivery system for receiving the cabin exhaust airflow.

The aircraft of any preceding clause, wherein the fuel cell assembly is a polymer exchange membrane fuel cell assembly.

The aircraft of any preceding clause, wherein the fuel cell assembly comprises a fuel cell having an anode and a cathode, and wherein the cathode of the fuel cell is in airflow communication with the cabin exhaust delivery system for receiving the cabin exhaust airflow.

The aircraft of any preceding clause, wherein the environmental control system comprises a compressor, an air cycle machine, and an electric motor drivingly coupled to the compressor and the air cycle machine.

The aircraft of any preceding clause, wherein the electric motor defines a maximum power draw, wherein the fuel cell assembly defines a maximum power rating, and wherein the maximum power rating is higher than the maximum power draw.

The aircraft of any preceding clause, wherein the fuel cell assembly is in electrical communication with the electric motor of the environmental control system for providing electrical power to the electric motor of the environmental control system.

The aircraft of any preceding clause, wherein the environmental control system comprises a compressor and an air cycle machine, and wherein the environmental control system assembly further comprises a mixer, wherein the mixer is in airflow communication with the cabin airflow delivery system, wherein the environmental control system assembly further comprises a recirculation airflow path extending from the cabin to the mixer.

A method of operating a fuel cell assembly comprising: providing a cabin exhaust airflow from a cabin of an aircraft through a cabin exhaust delivery system to a fuel cell assembly; and generating electrical power with the fuel cell assembly using the cabin exhaust airflow.

The method of any preceding clause, wherein providing the cabin exhaust airflow from the cabin of the aircraft through the cabin exhaust delivery system to the fuel cell assembly comprises providing the cabin exhaust delivery system to the fuel cell assembly at a temperature of between 60 degrees Celsius and 90 degrees Celsius, and at a pressure of between 60 kilopascals and 100 kilopascals.

The method of any preceding clause, further comprising: providing at least a portion of the electrical power generated to an environmental control system of the aircraft.

The method of any preceding clause, further comprising: providing all of an electric power consumed by an environmental control system during a flight operation of the aircraft from the fuel cell assembly.

An environmental control system assembly for an aircraft, the assembly comprising: an environmental control system; a fuel cell assembly in electrical communication with the environmental control system for providing electrical power to the environmental control system; and a controller operably connected to the fuel cell assembly, the controller operable to modulate an amount of power generated by the fuel cell assembly and provided to the environmental control system based on load forecasting data from an ECS load forecasting module of the controller.

The assembly of any preceding clause, wherein the ECS load forecasting module determines the load forecasting data based on a passenger number for the aircraft, weather forecast data, historical data, or a combination thereof.

The assembly of any preceding clause, wherein the ECS load forecasting module determines the load forecasting data based on a passenger number for the aircraft.

The assembly of any preceding clause, wherein the ECS load forecasting module defines an anticipated forecast timing of at least five minutes ahead and up to one hour ahead.

The assembly of any preceding clause, wherein the ECS load forecasting module comprises a load forecasting model.

The assembly of any preceding clause, wherein the environmental control system is in airflow communication with a cabin of the aircraft, and wherein the fuel cell assembly is in airflow communication with the cabin of the aircraft for receiving a cabin exhaust airflow from the cabin.

The assembly of any preceding clause, wherein the environmental control system comprises a compressor section, and wherein the fuel cell assembly is in airflow communication with the compressor section of the environmental control system for receiving a pressurized airflow from the environmental control system.

The assembly of any preceding clause, wherein the controller further comprises an objective function module, and wherein the controller is operable to modulate the amount of power generated by the fuel cell assembly and provided to the environmental control system based at least in part on the objective function module.

The assembly of any preceding clause, wherein the objective function module is operable between one or more objective functions, the one or more objective function selected from the following objective functions: maximum efficiency, maximum power output, maximum component life, and minimum emissions output.

The assembly of any preceding clause, wherein to modulate the amount of power generated by the fuel cell assembly and provided to the environmental control system the controller is operable to modify an operating condition of the fuel cell.

The assembly of any preceding clause, wherein the operating condition comprises a fuel cell temperature, a current output, a fuel utilization, an air utilization, or a combination thereof.

The assembly of any preceding clause, wherein the controller is operable to modulate the amount of power generated by the fuel cell assembly and provided to the environmental control system based on a feedback control scheme and a feedforward control scheme.

A method of operating an environmental control system assembly for an aircraft, the method comprising: determining ECS load forecasting data for an environmental control system of the environmental control system assembly; and controlling a fuel cell assembly in electrical communication with the environmental control system to modulate an amount of power generated by the fuel cell assembly and provided to the environmental control system in response to the determined ECS load forecasting data.

The method of any preceding clause, wherein determining the ECS load forecasting data for the environmental control system comprises receiving data from a source external from the environmental control system assembly.

The method of any preceding clause, wherein determining the ECS load forecasting data for the environmental control system comprises receiving data indicative of a passenger number for a flight operation of the aircraft.

The method of any preceding clause, wherein determining the ECS load forecasting data for the environmental control system comprises determining the ECS load forecasting data for the environmental control system with an ECS load forecasting module.

The method of any preceding clause, wherein determining the ECS load forecasting data for the environmental control system with the ECS load forecasting module comprises determining the ECS load forecasting data for the environmental control system with a load forecasting model of the ECS load forecasting module using load forecasting factors.

The method of any preceding clause, wherein determining ECS load forecasting data for the environmental control system of the environmental control system assembly comprises determining the ECS load forecasting data based on a passenger number for the aircraft, weather forecast data, historical data, or a combination thereof.

The method of any preceding clause, wherein determining ECS load forecasting data for the environmental control system of the environmental control system assembly comprises determining the ECS load forecasting data based on a passenger number for the aircraft.

The method of any preceding clause, wherein the environmental control system is in airflow communication with a cabin of the aircraft, and wherein the fuel cell assembly is in airflow communication with the environmental control system, the cabin of the aircraft, or both.

The assembly of any preceding clause, wherein the fuel cell assembly includes a fuel cell in direct airflow communication with a compressor of the environmental control system.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. An environmental control system assembly for an aircraft, the assembly comprising:
   an environmental control system comprising an initial compressor and an air cycle machine, wherein the initial compressor is upstream of the air cycle machine;
   a cabin airflow delivery system comprising a mixer in airflow communication with the environmental control system for receiving a cabin inlet airflow from the environmental control system;
   a cabin exhaust delivery system configured to be in airflow communication with a cabin of the aircraft for receiving a cabin exhaust airflow when the environmental control system assembly is installed in the aircraft;
   a fuel cell assembly in airflow communication with the cabin exhaust delivery system for receiving the cabin exhaust airflow; and
   a recirculation airflow path extending from the cabin to the mixer of the cabin airflow delivery system.

2. The environmental control system assembly of claim 1, wherein the fuel cell assembly is a polymer exchange membrane fuel cell assembly.

3. The environmental control system assembly of claim 1, wherein the fuel cell assembly comprises a fuel cell having an anode and a cathode, and wherein the cathode of the fuel cell is in airflow communication with the cabin exhaust delivery system for receiving the cabin exhaust airflow.

4. The environmental control system assembly of claim 1, wherein the environmental control system comprises an airflow conditioner.

5. The environmental control system assembly of claim 4, wherein the airflow conditioner is configured to receive an ambient airflow, a bleed airflow from an engine, or both.

6. The environmental control system assembly of claim 4, wherein the environmental control system further comprises an electric motor drivingly coupled to the initial compressor and the air cycle machine, wherein the electric motor defines a maximum power draw, wherein the fuel cell assembly defines a maximum power rating, and wherein the maximum power rating is higher than the maximum power draw.

7. The environmental control system assembly of claim 6, wherein the fuel cell assembly is in electrical communication with the electric motor of the environmental control system for providing electrical power to the electric motor of the environmental control system.

8. The environmental control system assembly of claim 1, further comprising:
   a recirculation fan in airflow communication with the cabin exhaust delivery system, the recirculation airflow path, or both for increasing a pressure of an airflow therethrough.

9. An aircraft comprising:
   a body comprising a fuselage and one or more wings, the fuselage defining a cabin; and
   an environmental control system assembly positioned within the body of the aircraft, the environmental control system assembly comprising:
   an environmental control system comprising an initial compressor and an air cycle machine, wherein the initial compressor is upstream of the air cycle machine;
   a cabin airflow delivery system comprising a mixer in airflow communication with the environmental control system for receiving a cabin inlet airflow from the environmental control system;
   a cabin exhaust delivery system configured in airflow communication with the cabin of the aircraft for receiving a cabin exhaust airflow; and
   a fuel cell assembly in airflow communication with the cabin exhaust delivery system for receiving the cabin exhaust airflow; and
   a recirculation airflow path extending from the cabin to the mixer of the cabin airflow delivery system.

10. The aircraft of claim 9, wherein the fuel cell assembly is a polymer exchange membrane fuel cell assembly.

11. The aircraft of claim 9, wherein the fuel cell assembly comprises a fuel cell having an anode and a cathode, and wherein the cathode of the fuel cell is in airflow communication with the cabin exhaust delivery system for receiving the cabin exhaust airflow.

12. The aircraft of claim 9, wherein the environmental control system comprises an electric motor drivingly coupled to the initial compressor and the air cycle machine.

13. The aircraft of claim 12, wherein the electric motor defines a maximum power draw, wherein the fuel cell assembly defines a maximum power rating, and wherein the maximum power rating is higher than the maximum power draw.

14. The aircraft of claim 12, wherein the fuel cell assembly is in electrical communication with the electric motor of the environmental control system for providing electrical power to the electric motor of the environmental control system.

* * * * *